United States Patent
Pakrooh et al.

(10) Patent No.: US 12,476,847 B2
(45) Date of Patent: Nov. 18, 2025

(54) RADIO FREQUENCY SENSING WITH CHANNEL IMPULSE RESPONSE

(71) Applicant: QUALCOMM Incorporated, San Diego, CA (US)

(72) Inventors: Pooria Pakrooh, San Diego, CA (US); Bin Tian, San Diego, CA (US); Stephen Jay Shellhammer, Ramona, CA (US); Koorosh Akhavan, San Diego, CA (US); Le Nguyen Luong, San Diego, CA (US); Ishaque Ashar Kadampot, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 729 days.

(21) Appl. No.: 17/804,243

(22) Filed: May 26, 2022

(65) Prior Publication Data

US 2023/0291610 A1    Sep. 14, 2023

Related U.S. Application Data

(60) Provisional application No. 63/269,032, filed on Mar. 8, 2022.

(51) Int. Cl.
*H04L 25/02* (2006.01)
*H04W 52/52* (2009.01)

(52) U.S. Cl.
CPC ......... *H04L 25/0212* (2013.01); *H04W 52/52* (2013.01)

(58) Field of Classification Search
None
See application file for complete search history.

(56) References Cited

U.S. PATENT DOCUMENTS

| | | | |
|---|---|---|---|
| 9,178,562 B2 * | 11/2015 | Dua | H04B 1/7115 |
| 11,233,533 B1 | 1/2022 | Zhao et al. | |
| 2004/0132443 A1 | 7/2004 | Klein et al. | |

(Continued)

FOREIGN PATENT DOCUMENTS

| | | | | |
|---|---|---|---|---|
| WO | WO-2019170256 A1 * | 9/2019 | | H04J 3/0667 |
| WO | WO-2021086363 A1 * | 5/2021 | | G01S 13/76 |
| WO | 2021228658 A1 | 11/2021 | | |

OTHER PUBLICATIONS

International Search Report and Written Opinion—PCT/US2023/061759—ISA/EPO—Jul. 27, 2023.

(Continued)

*Primary Examiner* — Christopher T Wyllie
(74) *Attorney, Agent, or Firm* — Harrity & Harrity, LLP

(57) ABSTRACT

Various aspects of the present disclosure generally relate to wireless communication. In some aspects, a responding device may receive a signal from an initiating device. The responding device may estimate, from the signal, a channel impulse response (CIR) that represents signal reflections from one or more objects as multiple taps. The responding device may select one or more taps, from the multiple taps, that are within a first time window that starts at a first offset from a reference point and that has a first specified time duration. The responding device may transmit, to the initiating device, a CIR report that indicates the one or more taps. Numerous other aspects are described.

30 Claims, 14 Drawing Sheets

1100

(56) References Cited

U.S. PATENT DOCUMENTS

| | | | | |
|---|---|---|---|---|
| 2006/0187816 | A1* | 8/2006 | Kim | H04L 27/2657 370/208 |
| 2007/0165845 | A1* | 7/2007 | Ye | H04L 9/0875 380/30 |
| 2011/0149943 | A1* | 6/2011 | Srinivasan | H04L 25/0212 375/340 |
| 2014/0169385 | A1* | 6/2014 | Hadani | H04W 24/02 370/436 |
| 2018/0131540 | A1* | 5/2018 | Malik | H04L 25/022 |
| 2019/0086505 | A1* | 3/2019 | Malik | G01S 5/08 |
| 2020/0145160 | A1 | 5/2020 | Jiang et al. | |
| 2020/0191943 | A1* | 6/2020 | Wu | G01S 13/726 |
| 2021/0190702 | A1* | 6/2021 | Wu | G01S 7/411 |
| 2021/0368338 | A1* | 11/2021 | Lord | H04W 64/00 |
| 2022/0166649 | A1* | 5/2022 | Lafer | H04L 25/0212 |
| 2022/0350010 | A1* | 11/2022 | Sagi | G01S 13/04 |
| 2023/0291610 | A1* | 9/2023 | Pakrooh | H04L 25/0212 |
| 2024/0230831 | A1* | 7/2024 | Dhekne | G01S 5/021 |
| 2024/0380641 | A1* | 11/2024 | Pakrooh | G01S 7/006 |
| 2024/0430727 | A1* | 12/2024 | Pakrooh | H04L 25/0212 |
| 2025/0047527 | A1* | 2/2025 | Peng | H04L 25/02 |
| 2025/0141715 | A1* | 5/2025 | Wang | H04L 25/0204 |

OTHER PUBLICATIONS

Leong F., et al., "Sensing—Continued", IEEE Draft, 15-22-0061-00-04AB-Sensing-Continued, IEEE-SA Mentor, Piscataway, NJ USA, vol. 802.15.4ab, Jan. 20, 2022, pp. 1-13, XP068188540, p. 7.

Sanyo, et al., "Effective (20us) Preambles for MIMO-OFDM", 11-04-0249-03-000n-20us-effective-preamble-mimo-ofdm, IEEE Draft, 11-04-0249-03-000N-20US-Effective-preamble Mimo-ofdm, IEEE-SA Mentor, Piscataway, NJ USA, vol. 802.11n, No. 3, May 11, 2004, pp. 1-35, XP017691240, p. 18.

Sun L., et al., "Integrity Protection to Support Secure Ranging in IR-UWB", IEEE Draft, 15-22-0072-00-04AB-Integrity-protection-to Support-secure-ranging-in-IR-UWB, IEEE-SA Mentor, Piscataway, NJ USA, vol. 802.15.4ab, Jan. 23, 2022, 20 pages, XP068188597, p. 5-p. 7.

Pakrooh P (Qualcomm): "Link Budget Analysis and CIR Reporting for UWB RF Sensing", IEEE 802.15-22-0066-00-04ab, IEEE-SA Mentor, Piscataway, NJ USA, vol. 802.15.4ab, No. 1, Jan. 21, 2022, XP068188584, pp. 1-20.

Partial International Search Report—PCT/US2023/061759—ISA/EPO—May 4, 2023.

* cited by examiner

RADIO FREQUENCY SENSING WITH CHANNEL IMPULSE RESPONSE

CROSS-REFERENCE TO RELATED APPLICATION

This Patent Application claims priority to U.S. Provisional Patent Application No. 63/269,032, filed on Mar. 8, 2022, entitled "RADIO FREQUENCY SENSING WITH CHANNEL IMPULSE RESPONSE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for radio frequency sensing using channel impulse responses.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP). Other technologies may include ultra-wideband (UWB) technologies or technologies that are specified by Institute of Electrical and Electronics Engineers (IEEE) 802 standards.

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a responding device. The method may include receiving a signal from an initiating device. The method may include estimating, from the signal, a channel impulse response (CIR) that represents signal reflections from one or more objects as multiple taps. The method may include selecting one or more taps, from the multiple taps, that are within a first time window that starts at a first offset from a reference point and that has a first specified time duration. The method may include transmitting, to the initiating device, a CIR report that indicates the one or more taps.

Some aspects described herein relate to a method of wireless communication performed by an initiating device. The method may include transmitting a signal with multiple packets from multiple transmit antennas. The method may include receiving, from a responding device, one or more CIR reports for each packet of the multiple packets. The method may include aligning, using one or more taps in the one or more CIR reports for each packet, the one or more CIR reports across the multiple packets to identify a target object, a location of the target object, or a movement of the target object, where the one or more taps are selected from within a time window. The method may include performing an action based at least in part on the target object, the location of the target object, or the movement of the target object.

Some aspects described herein relate to a responding device for wireless communication. The responding device may include a memory and one or more processors coupled to the memory. The one or more processors may be configured to receive a signal from an initiating device. The one or more processors may be configured to estimate, from the signal, a CIR that represents signal reflections from one or more objects as multiple taps. The one or more processors may be configured to select one or more taps, from the multiple taps, that are within a first time window that starts at a first offset from a reference point and that has a first specified time duration. The one or more processors may be configured to transmit, to the initiating device, a CIR report that indicates the one or more taps.

Some aspects described herein relate to an initiating device for wireless communication. The initiating device may include a memory and one or more processors coupled to the memory. The one or more processors may be configured to transmit a signal with multiple packets from multiple transmit antennas. The one or more processors may be configured to receive, from a responding device, one or more CIR reports for each packet of the multiple packets. The one or more processors may be configured to align, using one or more taps in the one or more CIR reports for each packet, the one or more CIR reports across the multiple packets to identify a target object, a location of the target object, or a movement of the target object, where the one or more taps are selected from within a time window. The one or more processors may be configured to perform an action based at least in part on the target object, the location of the target object, or the movement of the target object.

Some aspects described herein relate to a non-transitory computer-readable medium that stores a set of instructions for wireless communication by a responding device. The set of instructions, when executed by one or more processors of the responding device, may cause the responding device to receive a signal from an initiating device. The set of instructions, when executed by one or more processors of the responding device, may cause the responding device to estimate, from the signal, a CIR that represents signal reflections from one or more objects as multiple taps. The set of instructions, when executed by one or more processors of the responding device, may cause the responding device to select one or more taps, from the multiple taps, that are within a first time window that starts at a first offset from a reference point and that has a first specified time duration. The set of instructions, when executed by one or more processors of the responding device, may cause the responding device to transmit, to the initiating device, a CIR report that indicates the one or more taps.

Some aspects described herein relate to a non-transitory computer-readable medium that stores a set of instructions for wireless communication by an initiating device. The set of instructions, when executed by one or more processors of the initiating device, may cause the initiating device to transmit a signal with multiple packets from multiple transmit antennas. The set of instructions, when executed by one or more processors of the initiating device, may cause the initiating device to receive, from a responding device, one or more CIR reports for each packet of the multiple packets. The set of instructions, when executed by one or more processors of the initiating device, may cause the initiating device to align, using one or more taps in the one or more CIR reports for each packet, the one or more CIR reports across the multiple packets to identify a target object, a location of the target object, or a movement of the target object, where the one or more taps are selected from within a time window. The set of instructions, when executed by one or more processors of the initiating device, may cause the initiating device to perform an action based at least in part on the target object, the location of the target object, or the movement of the target object.

Some aspects described herein relate to an apparatus for wireless communication. The apparatus may include means for receiving a signal from an initiating device. The apparatus may include means for estimating, from the signal, a CIR that represents signal reflections from one or more objects as multiple taps. The apparatus may include means for selecting one or more taps, from the multiple taps, that are within a first time window that starts at a first offset from a reference point and that has a first specified time duration. The apparatus may include means for transmitting, to the initiating device, a CIR report that indicates the one or more taps.

Some aspects described herein relate to an apparatus for wireless communication. The apparatus may include means for transmitting a signal with multiple packets from multiple transmit antennas. The apparatus may include means for receiving, from a responding device, one or more CIR reports for each packet of the multiple packets. The apparatus may include means for aligning, using one or more taps in the one or more CIR reports for each packet, the one or more CIR reports across the multiple packets to identify a target object, a location of the target object, or a movement of the target object, where the one or more taps are selected from within a time window. The apparatus may include means for performing an action based at least in part on the target object, the location of the target object, or the movement of the target object.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

UWB technology may be used to transmit signals with wide bandwidth (e.g., >=500 MHz). Signal energy may be transmitted with minimal interference with narrowband and carrier wave transmission in the same frequency band. UWB may be used for low-energy, short-range applications (e.g., for ranging). UWB is presently divided into channels 1-15 spanning frequencies from about 3.5 GHz to about 4.5 GHz and from about 6.5 GHz to about 10 GHz.

Figure 1:
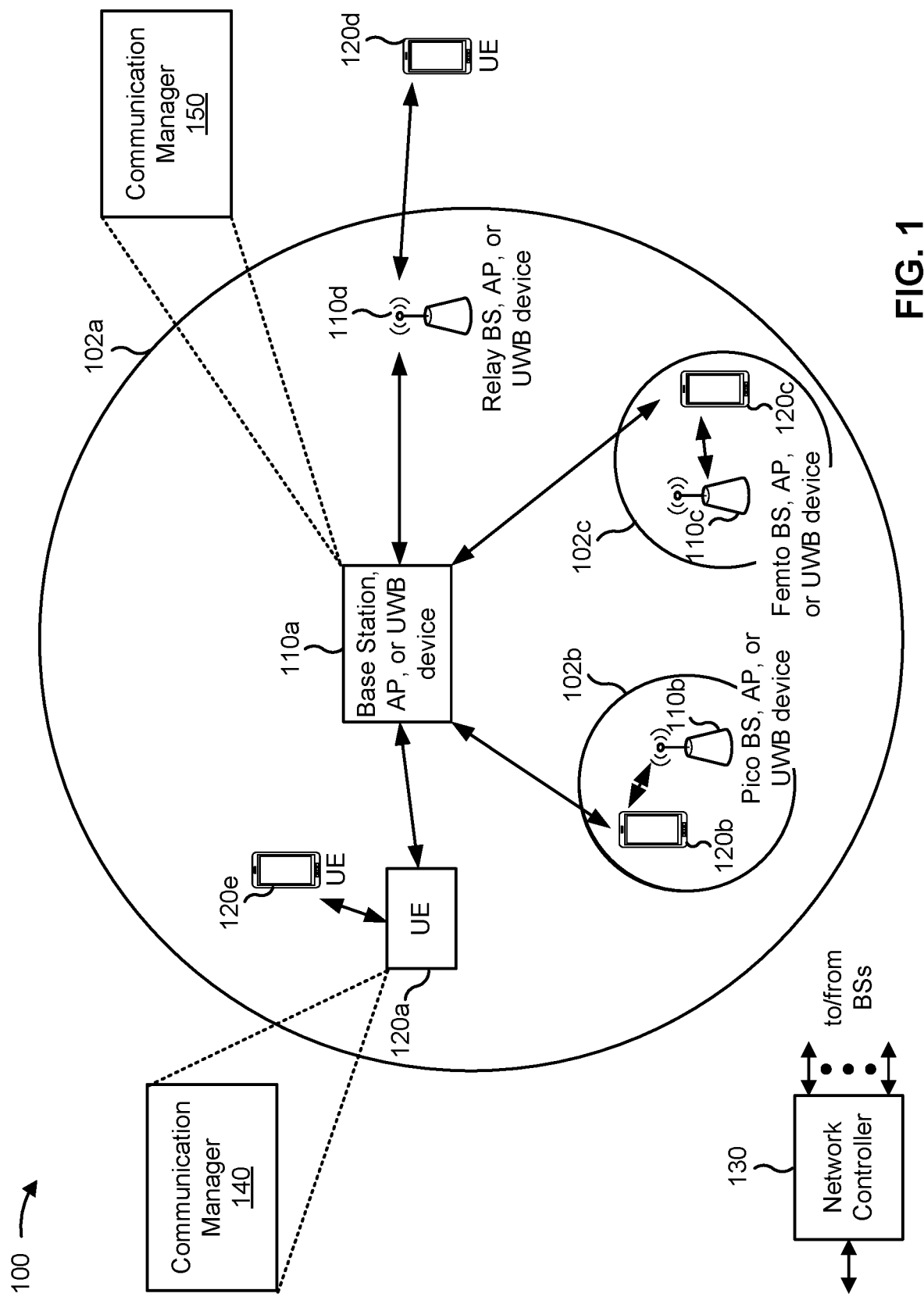
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network, a 4G (e.g., Long Term Evolution (LTE)) network, wide area network (WAN) access points (APs), personal area network (PAN) access points and devices, or ultra-wideband (UWB) devices (e.g., UWB anchor, UWB tag), among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as a base station, AP, or UWB device 110 (shown as BS, AP, or UWB device 110a, pico BS, AP, or UWB device 110b, femto BS, AP, or UWB device 110c, and relay BS, AP, or UWB device 110d) and/or other network entities. A base station, AP, or UWB device 110 is a network entity that communicates with UEs 120. A base station, AP, or UWB device 110 (sometimes referred to as a BS) may include, for example, an NR base station, an LTE base station, a Node B, an eNB (e.g., in 4G), a gNB (e.g., in 5G), a WAN AP, a PAN AP, and/or a transmission reception point (TRP). Each base station, AP, or UWB device 110 may provide communication coverage for a particular geographic area. The term "cell" can refer to a coverage area of a base station, AP, or UWB device 110, an access point, and/or a base station subsystem serving this coverage area, depending on the context in which the term is used.

A base station, AP, or UWB device 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the BS, AP, or UWB device 110a may be a macro base station, AP, or UWB device for a macro cell 102a, the BS, AP, or UWB device 110b may be a pico base station, AP, or UWB device for a pico cell 102b, and the BS, AP, or UWB device 110c may be a femto base station, AP, or UWB device for a femto cell 102c. A base station may support one or multiple (e.g., three) cells. A network entity may be: a macro base station, AP, or UWB device; a pico base station, AP, or UWB device; or a femto base station, AP, or UWB device.

In some examples, a cell may not necessarily be stationary, and the geographic area of the cell may move according to the location of a base station, AP, or UWB device 110 that is mobile (e.g., a mobile base station). In some examples, the base stations, APs, or UWB devices 110 may be interconnected to one another and/or to one or more other base stations, APs, or UWB devices 110 or network entities in the wireless network 100 through various types of backhaul interfaces, such as a direct physical connection or a virtual network, using any suitable transport network.

In some aspects, the term "base station" or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station" or "network entity" may refer to one device configured to perform one or more functions, such as those described herein in connection with the base station, AP, or UWB device 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station. A WAN access point, a PAN access point, or an UWB access point may also be referred to as a "network entity." A network entity may include components described for the base station, AP, or UWB device 110.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS, AP, or UWB device 110d (e.g., a relay base station) may communicate with the BS, AP, or UWB device 110a (e.g., a macro base station, access point) and the UE 120d in order to facilitate communication between the BS, AP, or UWB device 110a and the UE 120d. A base station that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations, APs, or UWB devices 110 may have different transmit power levels, different coverage areas, and/or different impacts on interference in the wireless network 100. For example, macro base stations, APs, or UWB devices may have a high transmit power level (e.g., 5 to 40 watts) whereas pico base stations, APs, or UWB devices, femto base stations, APs, or UWB devices, and relay base stations, APs, or UWB devices may have lower transmit power levels (e.g., 0.1 to 2 watts).

A network controller 130 may couple to or communicate with a set network entities and may provide coordination and control for these network entities. The network controller 130 may communicate with the base stations, APs, or UWB devices 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium. A UE 120 may be capable of UWB communications.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed. In some cases, WANs, PANs, or UWB networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station, AP, or UWB device 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. A UWB frequency bandwidth may be greater than 500 MHz. UWB is presently divided into channels 1-15 spanning frequencies from about 3.5 GHz to about 4.5 GHz and from about 6.5 GHz to about 10 GHz. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a responding device (e.g., a UE 120, base station, AP, or UWB device 110, a network entity) may include a communication manager 140 or 150. As described in more detail elsewhere herein, the communication manager 140 or 150 may receive a signal from an initiating device. The communication manager 140 or 150 may estimate, from the signal, a channel impulse response (CIR) that represents signal reflections from one or more objects as multiple taps and select one or more taps, from the multiple taps, that are within a first time window that starts at a first offset from a reference point and that has a first specified time duration. The communication manager 140 or 150 may transmit, to the initiating device, a CIR report that indicates the one or more taps.

In some aspects, an initiating device (e.g., a UE 120, base station, AP, or UWB device 110, a network entity) may include a communication manager 140 or 150. As described in more detail elsewhere herein, the communication manager 140 or 150 of the initiating device may transmit a signal with multiple packets from multiple transmit antennas and receive, from a responding device, one or more CIR reports for each packet of the multiple packets. The communication manager 140 or 150 may align, using one or more taps in the one or more CIR reports for each packet, the one or more CIR reports across the multiple packets to identify a target object, a location of the target object, or a movement of the target object, where the one or more taps are selected from within a time window. The communication manager 140 or 150 may perform an action based at least in part on the target object, the location of the target object, or the movement of the target object. Additionally, or alternatively, the communication manager 140 or 150 of the initiating device may perform one or more other operations described herein.

As indicated above, FIG. 1 is provided as an example. Other examples may differ from what is described with regard to FIG. 1.

Figure 2:
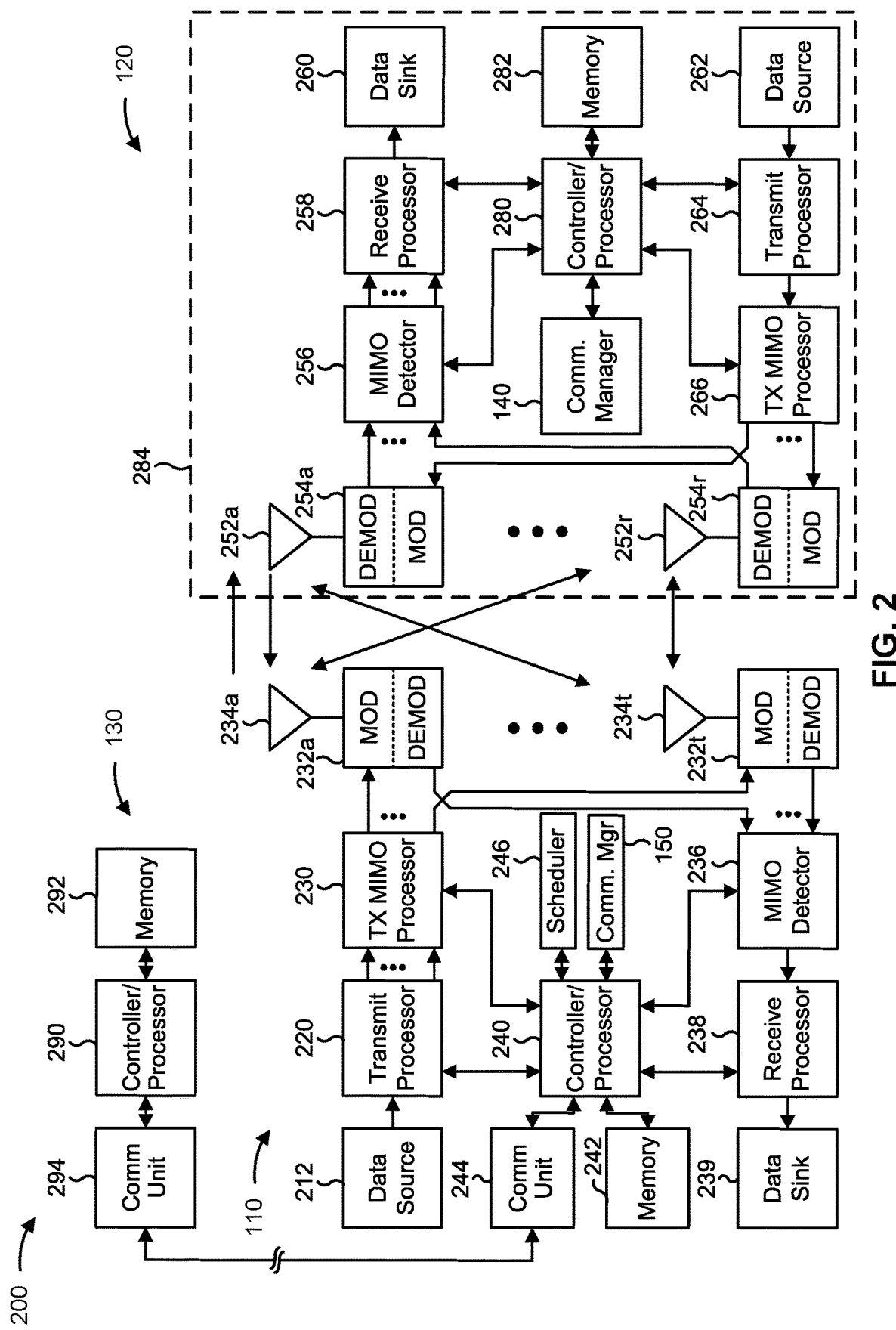
FIG. 2 is a diagram illustrating an example of a base station in communication with a user equipment (UE) in a wireless network, in accordance with the present disclosure.

FIG. 2 is a diagram illustrating an example 200 of a network entity (e.g., base station, AP, or UWB device 110) in communication with a UE 120 in a wireless network 100, in accordance with the present disclosure. The base station, AP, or UWB device 110 may be equipped with a set of antennas 234a through 234t, such as T antennas (T≥1). The UE 120 may be equipped with a set of antennas 252a through 252r, such as R antennas (R≥1). The network entity may be a WAN access point or UWB-capable device that includes components as described for the base station, AP, or UWB device 110 and that operates in accordance with Institute of Electrical Engineers (IEEE) standards (e.g., IEEE 802).

At the base station, AP, or UWB device 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station, AP, or UWB device 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station, AP, or UWB device 110 and/or other base stations or APs 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-14).

At the network entity (e.g., base station, AP, or UWB device 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-14).

A controller/processor of a network entity (e.g., the controller/processor 240 of base station, AP, or UWB device 110), the controller/processor 280 of the UE 120, and/or any other component(s) of FIG. 2 may perform one or more techniques associated with RF sensing, as described in more detail elsewhere herein. For example, the controller/processor 240 of the base station, AP, or UWB device 110 or the access point, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a responding device (e.g., a UE 120, base station, AP, or UWB device 110, a network entity) includes means for receiving a signal from an initiating device; means for estimating, from the signal, a CIR that represents signal reflections from one or more objects as multiple taps; means for selecting one or more taps, from the multiple taps, that are within a first time window that starts at a first offset from a reference point and that has a first specified time duration; and/or means for transmitting, to the initiating device, a CIR report that indicates the one or more taps. In some aspects, the means for the responding device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the responding device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an initiating device (e.g., a UE 120, base station, AP, or UWB device 110, a network entity) includes means for transmitting a signal with multiple packets from multiple transmit antennas; means for receiving, from a responding device, one or more CIR reports for each packet of the multiple packets; means for aligning, using one or more taps in the one or more CIR reports for each packet, the one or more CIR reports across the multiple packets to identify a target object, a location of the target object, or a movement of the target object, where the one or more taps are selected from within a time window; and/or means for performing an action based at least in part on the target object, the location of the target object, or the movement of the target object. In some aspects, the means for the initiating device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the initiating device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
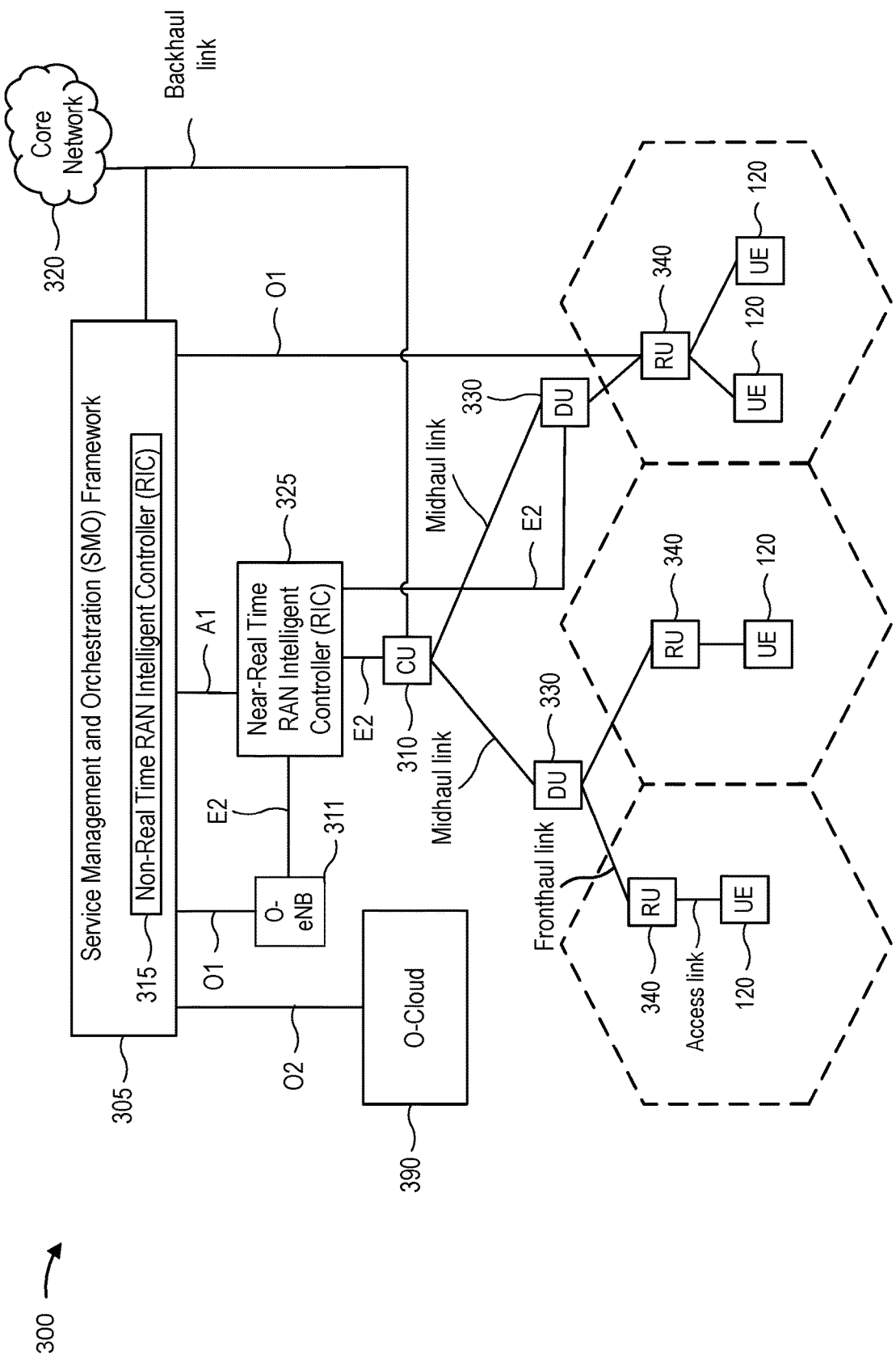
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, AP, a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs")" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
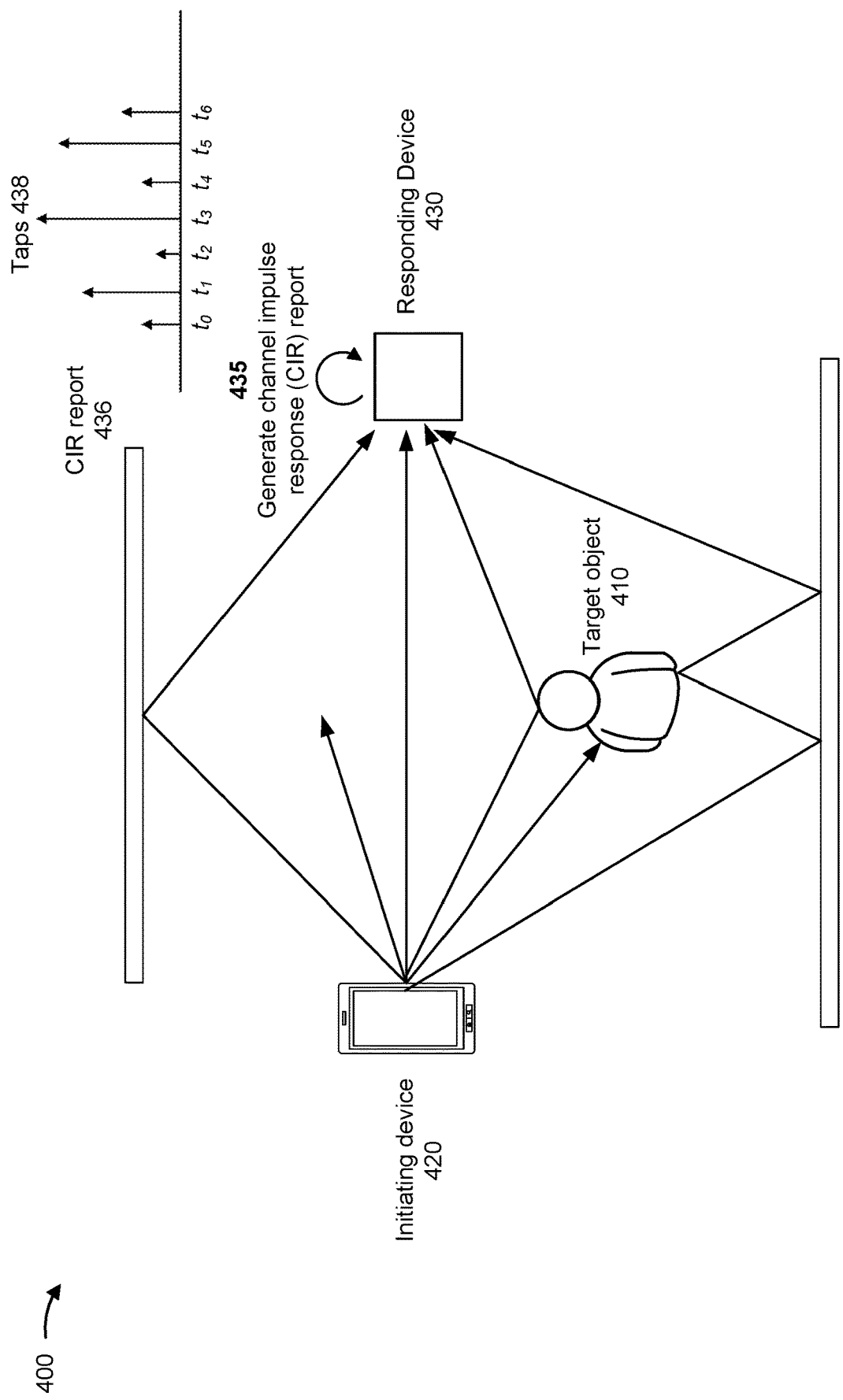
FIGS. 4-5 are diagrams illustrating an example of radio frequency sensing, in accordance with the present disclosure.
Figure 5:
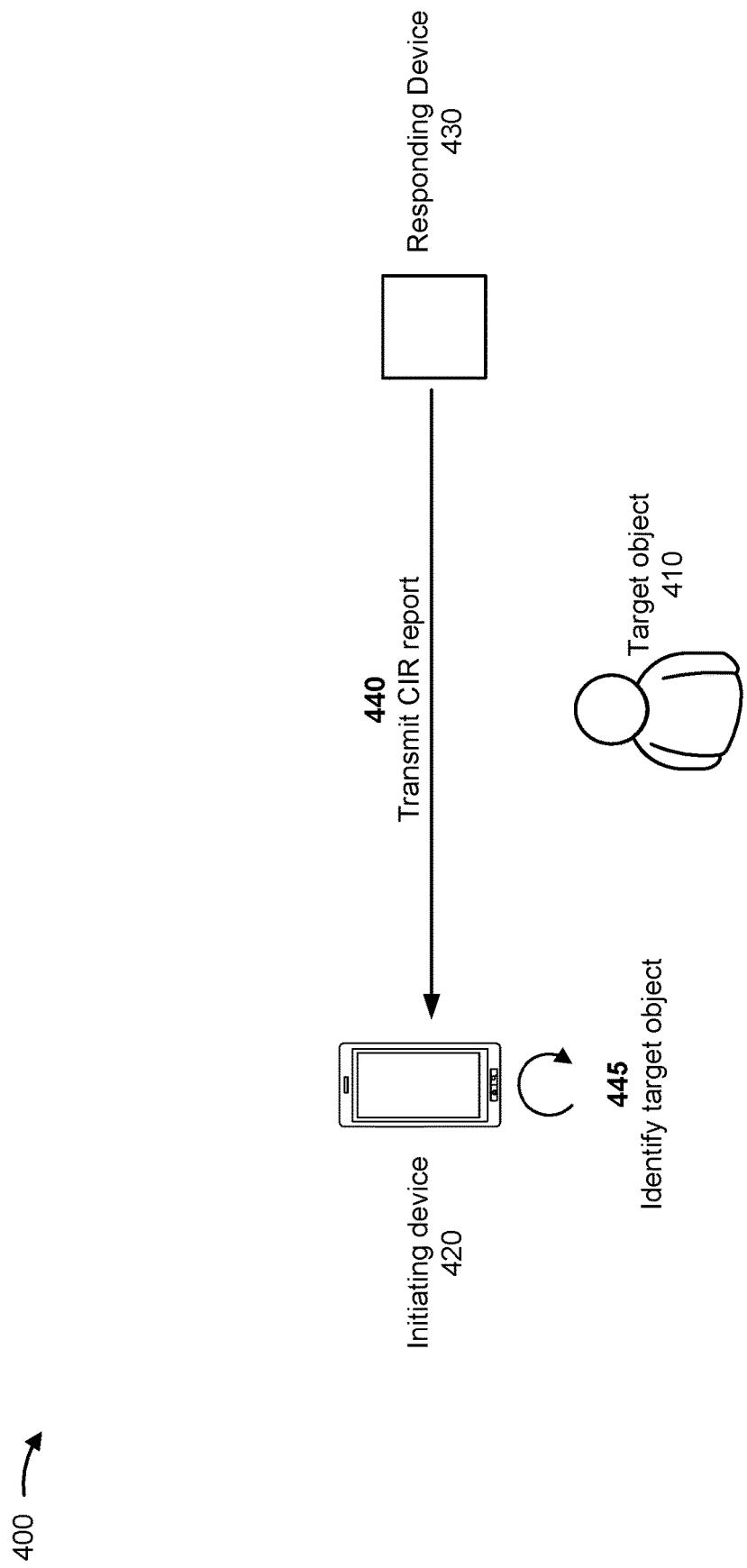

FIGS. 4-5 are diagrams illustrating an example 400 of RF sensing, in accordance with the present disclosure.

RF sensing may be used to identify a target object 410. Example 400 shows an example of bi-static one-way sensing. An initiating device 420 (e.g., a UE 120, base station, AP, or UWB device 110, a network entity) may be a sensing device that initiates an UWB RF sensing session with one or more other UWB devices. The initiating device 420 may transmit a signal with multiple packets that is reflected off of the target object 410 (e.g., a user, another human, a body part, an animal, a robot) and other surfaces. A responding device 430 may receive the direct signal and reflections of the signal. The responding device 430 (e.g., a UE 120, base station, AP, or UWB device 110, a network entity) may be a sensing device that responds to the initiating device 420.

Ranging, which includes determining a distance to an object, may rely on the estimation of earliest path in a CIR. The responding device 430 may estimate a CIR from the received signal. While a direct signal may be received, RF sensing may focus on reflected signals and may distinguish reflected signals from the direct signal by strength, time, or other information. The CIR may represent or characterize signal reflections from one or more objects as one or more taps. Taps may indicate a signal strength of reflected signals received at different points in time (e.g., $t_0$, $t_1$, and so forth).

The points in time may be sampling time occasions. Communications may mostly utilize the few strongest CIR taps.

As shown by FIG. 4 and by reference number 435, the responding device 430 may generate a CIR report 436 (e.g., CIR measurement report) that includes one or more of the taps 438. As shown by FIG. 4 and by reference number 440, the responding device 430 may transmit the CIR report 436 to the initiating device 420. As shown by reference number 445, the initiating device 420 may identify the target object 410 from the taps 438 of the CIR report 436.

RF sensing has different requirements than wireless communications. In IEEE standard 802.15, UWB data communication does not rely on any channel consistency from one packet to the next. However, for UWB ranging, inconsistent channel measurements from one packet to the next may cause the CIR report 436 for multiple packets to involve what appear to be inconsistent taps. RF sensing makes inferences about the changes in the environment by measuring changes in the wireless channels. If CIR measurement and reporting is not consistent, a wireless device may misinterpret that changes in the measured and reported wireless channel are due to changes in the physical environment and not due to the wireless device itself.

As indicated above, FIGS. 4-5 is provided as an example. Other examples may differ from what is described with regard to FIGS. 4-5.

Figure 6:
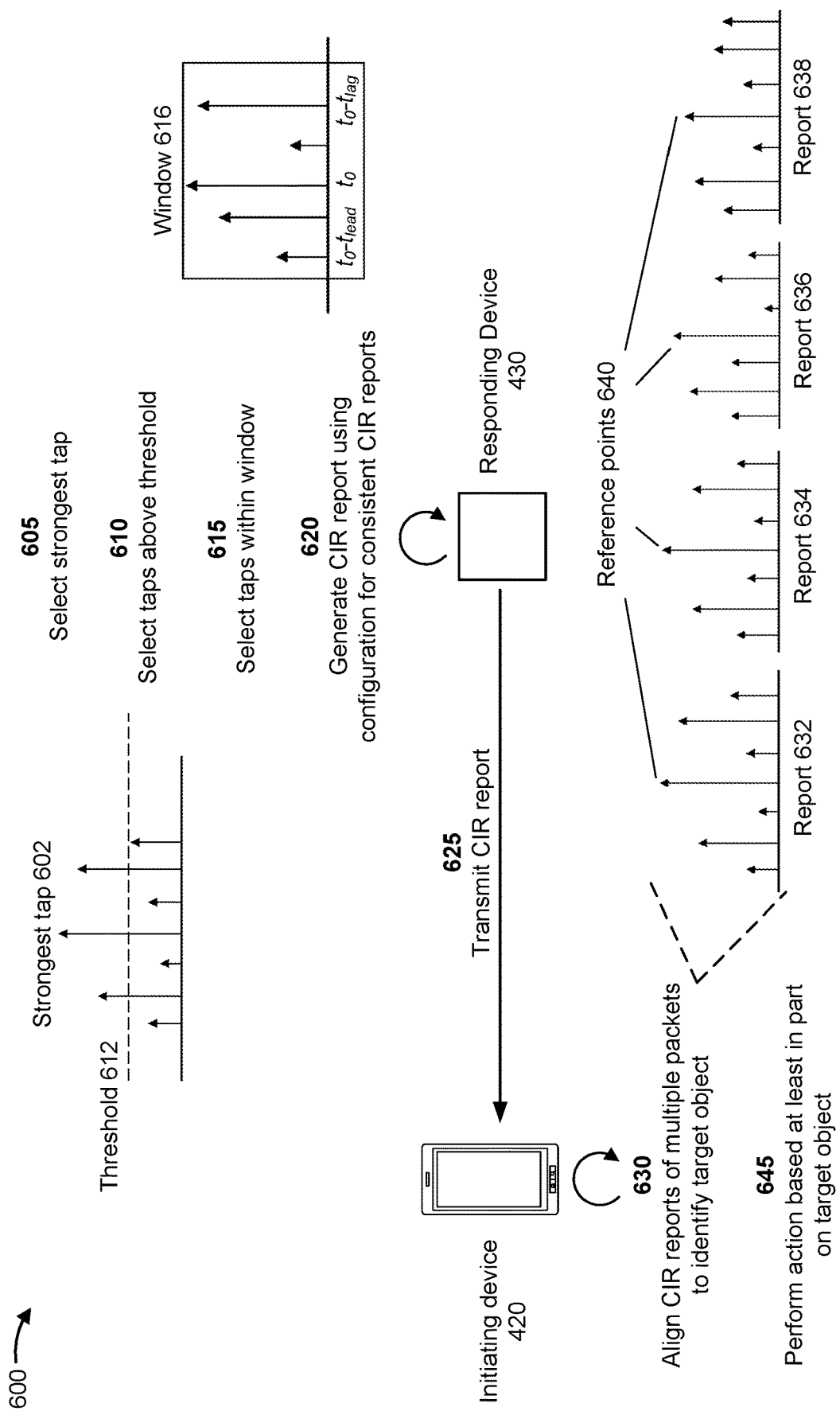
FIG. 6 is a diagram illustrating an example of aligning channel impulse response reports, in accordance with the present disclosure.

FIG. 6 is a diagram illustrating an example 600 of aligning CIR reports, in accordance with the present disclosure.

In some aspects, the responding device 430 may select one or more reference taps that the initiating device 420 may use to align the CIR report 436 from each of multiple packets. By aligning the CIR reports, the initiating device 420 may better identify the target object 410, movement of the target object 410, or other properties of the target object 410. The initiating device 420 may take more appropriate action with better identification of the target object 410 and conserve processing resources and signaling resources. For example, the initiating device may better detect a location of a body part of a user (e.g., human, robot, autonomous device), detect user activity (e.g., gesture or breathing pattern of human or animal), identify an object near the user, or detect movement of objects around the user, among other RF sensing uses.

As shown in example 400 of FIG. 4 and FIG. 5, the initiating device 420 may transmit a signal, and the responding device 430 may receive reflections of the signal off of one or more objects, including the target object 410. The responding device 430 may transmit CIR feedback (e.g., the CIR report 436) to the initiating device 420. Example 600 in FIG. 6 shows alignment of the CIR feedback at the initiating device 420 for more accurate RF sensing.

In some aspects, the responding device 430 may be configured (e.g., by the initiating device 420, by another device, or at production) to select one or more reference points to provide in the CIR report 436. A reference point may be an earliest tap, a strongest tap 602, a center of mass of taps, a packet detection time, or any other specified tap or time point. The responding device 430 may use a configuration for providing consistent CIR reports. Consistent CIR reports may be CIR reports that together work to provide accurate RF sensing information for objects. Consistent CIR reports may include CIR reports with information (e.g., taps, reference points) that the initiating device may use to align the CIR reports in time in order to match reflected signals to objects over time, in order to identify objects when movement is involved. The configuration may specify which taps to select for a CIR report, including how many taps before or after a reference point or how long before or after the reference point to collect taps.

In example 600, as shown by reference number 605, the responding device 430 may select the strongest tap 602 from among the taps for a packet of the transmitted signal. In some aspects, the responding device 430 may select the n strongest taps, where n is a configurable parameter that may be specified and adjusted based at least in part on sensing conditions.

In some aspects, as shown by reference number 610, the responding device 430 may select taps that satisfy a tap threshold 612 (e.g., minimum RSRP). This may be in addition to selecting the strongest tap 602. By specifying the selection of stronger taps, insignificant taps may be removed and signaling overhead may be decreased.

In some aspects, the responding device 430 may select all taps between an earliest tap that satisfies the threshold 612 and a latest tap that satisfies the threshold 612. This may provide some additional context for the reflected signals or additional reference taps for alignment without greatly increasing the signaling overhead.

In some aspects, as shown by reference number 615, the responding device 430 may select the taps that fall within a time window 616 of a specified time duration. The time duration may be specified (e.g., in the configuration) by a leading time duration value ($t_{lead}$) before a reference tap ($t_0$) (e.g., strongest tap 602) and a lagging time duration value ($t_{lag}$). The time duration may be a fixed length. In some aspects, the time duration may be large enough to capture important CIR taps expected for the RF sensing application, and the time duration may be adjusted depending on the RF sensing conditions or the RF application. For example, if a line of sight is not blocked between the initiating device 420 and the responding device 430, the strongest tap 602 may be close to the first tap. Therefore, the window may be defined to be asymmetrically around the strongest tap 602. The configuration may specify how many taps to report before and after a reference point like the strongest tap 602. In sum, as shown by reference number 620, the responding device 430 may generate the CIR report 436 using the configuration for consistent CIR reports to select taps to include in the CIR report 436, as described for FIG. 6.

Higher receiver sampling rates increase receiver complexity and reporting overhead and may result in exceeding payload size limit which includes the CIR report. Higher sampling rates could be left to interpolation at an initiator's upper layer post processing. In some aspects, the CIR feedback sampling rate may vary for identifying and selecting taps. For example, the feedback sampling rate may be multiples of a UWB chip rate or sensing bandwidth (e.g., 499.2 MHz), such as the UWB chip rate, 2 times the UWB chip rate, or 4 times the UWB chip rate. The responding device 430 may select a chip rate that is a reasonable balance between accuracy and complexity. For sensing at multiple frequency segments resulting in larger aggregated bandwidth, the chip rate may be equal to the aggregated bandwidth, leading to larger sampling rates.

In some aspects, depending on the range under coverage, the responding device 430 may determine the quantity of taps to use based at least in part on a delay spread to cover the region divided by the chip rate (and a scaling factor). For example, a 10 meter path coverage may use 17 taps at a chip rate of 2 nanoseconds (ns) or 34 taps at twice a chip rate of 1 ns.

In some aspects, the configuration may specify a format for CIR values in the CIR reports. The configuration may specify that a CIR report is to include an amplitude and a phase (e.g., polar domain) for each tap or other CIR value. The configuration may specify that a CIR report is to include an in-phase and quadrature (IQ) value for each tap or other CIR value.

A large quantity of bits in the CIR report may increase the reporting overhead. In some aspects, CIR values may be compressed for a CIR report. This may include normalizing tap amplitudes to a normalization factor, such as the strongest tap amplitude. The CIR report may include the normalization factor. The CIR report may include a differential IQ value, which may include a variation in IQ values across packets. In some aspects, for each tap in the CIR report, the IQ value may be normalized with an IQ normalization factor to a greatest IQ value (among available, configured, or specified IQ values), and the IQ normalization factor may be included in the CIR report.

In some aspects, a size of a CIR report may be based at least in part on a quantity of bits that are allocated for each tap in the CIR report and a sensing range under coverage and the CIR sampling rate. The quantity of bits may be, for example, 8 bits, 10 bits, or 12 bits for encoding each signed I and Q values. The responding device 430 may negotiate the quantity of bits with the initiating device 420 or other sensing devices. Sensing devices, such as the responding device 430, may declare or advertise (broadcast) bit size capabilities for the CIR report.

As shown by reference number 625, the responding device 430 may transmit the CIR report to the initiating device 420. The responding device 430 may transmit multiple CIR reports for multiple packets, each CIR report for one or more packets. As shown by reference number 630, the initiating device 420 may align the CIR reports to identify at least the target object 410. The initiating device 420 may align the CIR reports to identify other objects. The initiating device 420 may identify the target object 410, a location of the target object 410, movement of the target object 410, or other properties of the target object 410 (alone or in relation to the other objects) by associating taps in the CIR reports with the target object 410. Aligning the CIR reports helps the initiating device 420 to determine which taps in each CIR report correspond to other taps in the other CIR reports.

For example, the initiating device 420 may receive, among other CIR reports, four CIR reports for four packets. Example 600 shows report 632, report 634, report 636, and report 638. Without an appropriate reference point for each report, taps in one report would not be associated with other taps in another report and there would be no consistency among the CIR reports. RF sensing would be limited. However, in some aspects, the reports may each have reference point 640. In example 600, the reference points are, for example, the strongest tap 602 in each CIR. The reports in example 600 show multiple taps, but in some aspects, the report may include fewer, stronger taps or include taps in between specified taps.

The initiating device 420 may use the reference points 640 to align the reports and identify signals that correspond to the same object across the reports/packets. The initiating device 420 may use the signals that are matched to objects to identify objects, locations of objects, movements of objects, other properties for specific objects (including the target object 410), or properties of the environment around the objects.

As shown by reference number 645, the initiating device 420 may perform an action based at least in part on the target object 410, a location of the target object 410, a movement of the target object 410, or other properties of the target object 410. Such actions may include transmitting a communication to the target object 410, transmitting a communication to another device that uses an application that involves the target object 410, using the information about the target object 410 in an application (e.g., sensing application, health application, medical application, gaming application, industrial application), transmitting a notification about the target object 410, initiating movement because of the target object 410, or the like.

In example 600, the initiating device 420 may transmit signals toward the responding device 430, which may collect reflected signals. However, in other scenarios, the initiating device 420 and the responding device 430 may be co-located or may be the same device.

In some aspects, the responding device 430 may have multiple antennas that each receive signal reflections. The responding device 430 may generate a CIR report for each antenna. The responding device 430 may transmit separate CIR measurement reports for each antenna in one or multiple CIR reports. This may involve defining a window around each antenna's reference point. If the reference points are different for different antennas, then the responding device 430 may report a relative offset between the reference taps that are selected to be reported.

In some aspects, the responding device 430 may use one window that is defined for all of the multiple antennas. The reference point for the window may include a reference point of the first antenna (or any specified antenna) of the multiple antennas. The reference point may be based on a combined CIR measurement report. The responding device 430 may generate a combined CIR measurement report by adding the amplitude of the taps in the time domain after compensating for hardware delay differences between the antennas.

By using a configuration for consistent CIR reports and aligning CIR reports, a device may improve the accuracy and the functionality of RF sensing.

In some aspects, the initiating device 420 may receive a reflected signal at one or more receive antennas, estimate one or more CIR (e.g., one CIR per antenna) that represent signal reflections from one or more objects as multiple taps fore each receive antenna, select one or more taps, from the multiple taps, that are within a time window that starts at an offset from a reference point and that has a specified time duration, and generate a CIR report for each antenna of the multiple receive antennas, where the reference point is a common reference point among the multiple receive antennas. The initiating device 420 may provide the CIR report to upper layers of the initiating device 420. The initiating device 420 may align CIR reports that are based on the multiple receive antennas. The initiating device 420 may align CIR reports from the multiple receive antennas As indicated above, FIG. 6 is provided as an example. Other examples may differ from what is described with regard to FIG. 6.

Figure 7:
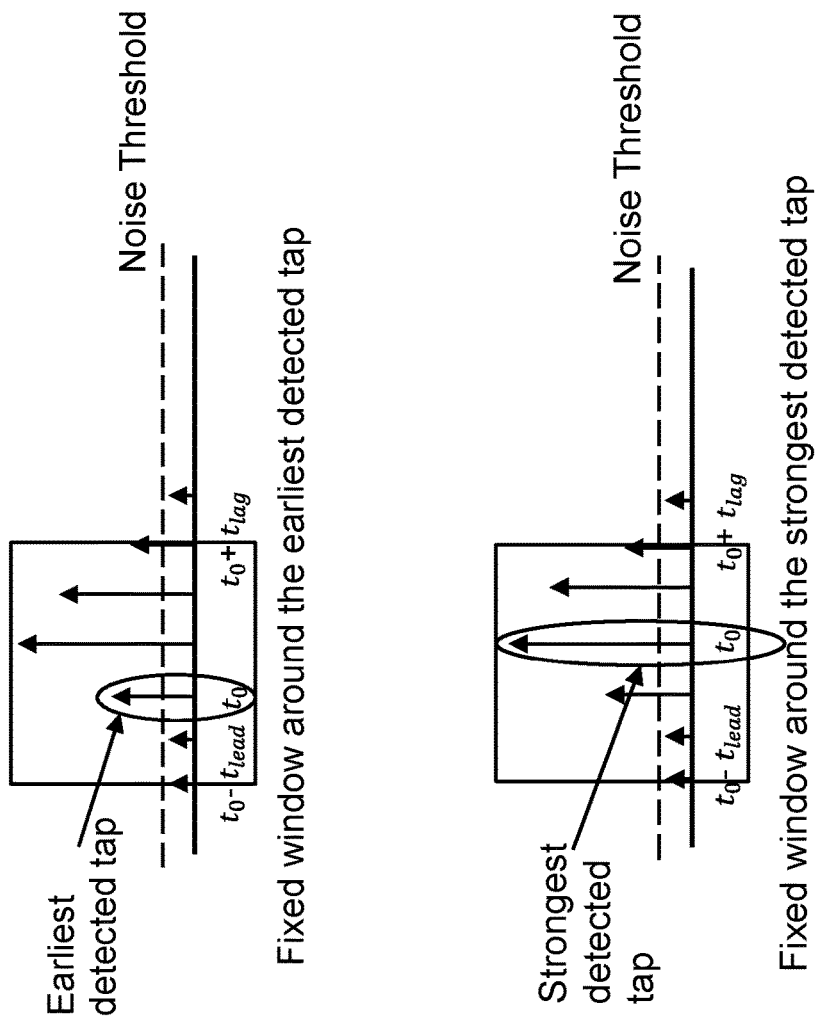
FIG. 7 is a diagram illustrating an example of windows for a channel impulse response (CIR) report, in accordance with the present disclosure.

FIG. 7 is a diagram illustrating an example 700 of windows for a CIR report, in accordance with the present disclosure.

Window-based CIR design may address some challenges of RF sensing, including a large dynamic range in CIR taps or inconsistency in CIR reports for multiple CIR measurements. Example 700 shows windows that may use an earliest detected tap or a strongest detected tap as a reference point. The windows may be fixed around such reference points. The windows may be centered on the reference points or may start with a specified offset from the reference point.

As indicated above, FIG. 7 is provided as an example. Other examples may differ from what is described with regard to FIG. 7.

Figure 8:
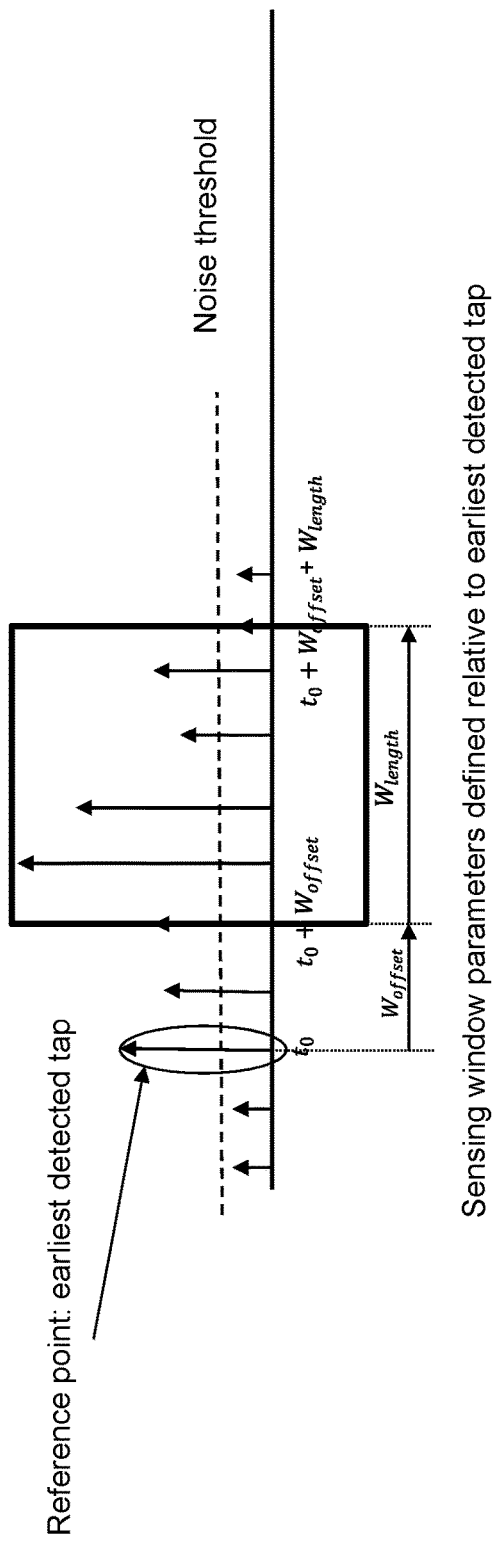
FIG. 8 is a diagram illustrating an example of a window for a CIR report, in accordance with the present disclosure.

FIG. 8 is a diagram illustrating an example 800 of a window for a CIR report, in accordance with the present disclosure.

According to various aspects described herein, the responding device 430 may consider additional parameters for window-based CIR reports. Example 800 shows a window that uses an earliest detected tap as a reference point at time $t_0$. The window may start at an offset $W_{offset}$ from the reference point at $t_0+W_{offset}$. The offset $W_{offset}$ may be based at least in part on a transmission time and a reference time associated with a sensing range of interest, which is an estimated distance range where the target object 410 may be found. The sensing range of interest may correspond to information about where the target object 410 is expected and may be limited by signal strength of reflected signals. The window may be of a specified time duration, shown by $W_{length}$. Other window parameters may include a quantity of parameters, a CIR report sampling rate, and/or a quantity of bits for IQ values in the CIR report. Additional parameters may be involved for a CIR report with multiple transmit antennas and receive antennas.

In some aspects, the length (specified time duration) of a window W length may be based at least in part on a sensing spread (distance) of interest from the initiating device 420 to the target object 410 (and other objects) and from the target object 410 (and other objects) to the responding device 430. For example, the specified time duration $d_{spread}$ may be 32 ns, which is sufficient to cover 10 meters of range and may balance sensing range coverage and a report size. Sensing at farther ranges provides very low reflected power for sensing. If duration $d_1$ is for the distance between the initiating device 420 and the target object 410, $d_2$ is for the distance between the target object 410 and the responding device 430, and $d_3$ is for the distance between the initiating device 420 and the responding device 430, the duration $d_{spread}$ may be $d_1+d_2-d_3$.

Many window parameters may be negotiated between devices. Negotiation may involve transmitting a preferred value that is accepted or rejected.

Counterproposals may be accepted or rejected. If there are multiple devices, in some aspects, the responding device 430 may negotiate a time reference for one window or for multiple windows with other sensing devices when out of band synchronization is possible. The responding device 430 may negotiate a size (time duration) or position for one or more windows with the initiating device 420. UWB devices may declare (e.g., broadcast) their capabilities for supporting a window size $W_{length}$, a window offset $W_{offset}$, or a quantity of windows. The responding device 430 may negotiate a window size $W_{offset}$, a window offset $W_{offset}$, and/or a quantity of windows with the initiating device 420 and/or with other UWB sensing devices. The responding device 430 may select a window size $W_{length}$, a window offset $W_{offset}$, and/or or a quantity of windows based at least in part on advertised capabilities of neighboring sensing devices, negotiations, and/or the range of interest. By negotiating a window size $W_{length}$, a window offset $W_{offset}$, and/or a quantity of windows, the responding device 430 may select better taps for the CIR report. As a result, the responding device 430 may generate an accurate CIR report and conserve processing resources. The initiating device 420 may use an accurate CIR report for ranging of the target object 410. In some aspects, the CIR report may include a transmit antenna index, a receive antenna index, an IQ value per receive chain/tap, a normalized IQ value, an IQ normalization factor, a window size $W_{length}$, a window offset $W_{offset}$, an interpolation offset (per receive chain), an RF chain phase calibration value per receive chain, and/or an RF chain latency calibration value per receive chain.

As indicated above, FIG. 8 is provided as an example. Other examples may differ from what is described with regard to FIG. 8.

Figure 9:
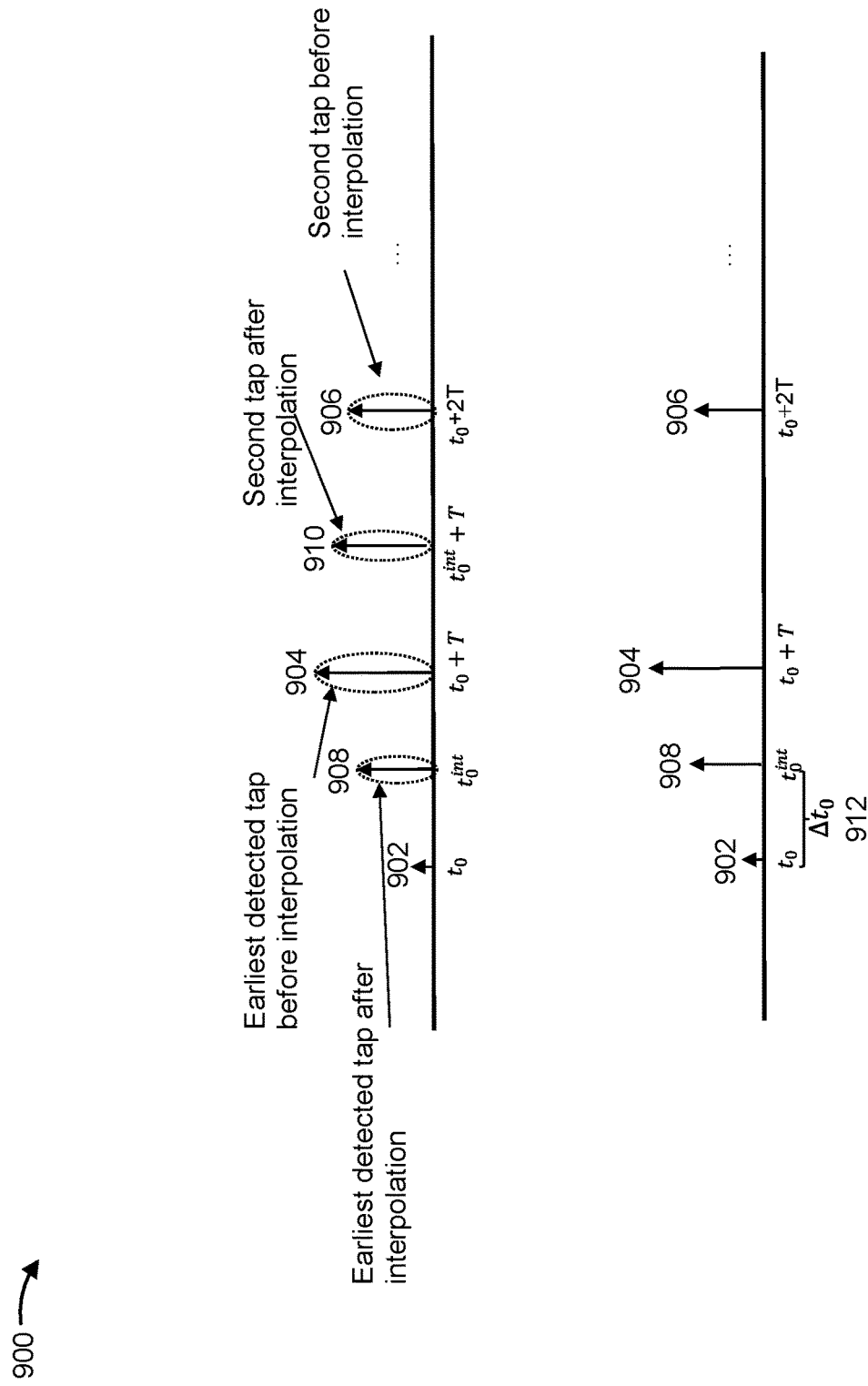
FIG. 9 is a diagram illustrating an example of generating a CIR report, in accordance with the present disclosure.

FIG. 9 is a diagram illustrating an example 900 of generating a CIR report, in accordance with the present disclosure. Example 900 shows tap 902, tap 904, and tap 906 of a CIR that are obtained at sampling time occasions located at non-interpolated grid points. That is, the responding device 430 may obtain tap 902, tap 904, and tap 906 without interpolation. The responding device may use interpolation between tap 902 and tap 904 to obtain interpolated tap 908 and use interpolation between tap 904 and tap 906 to obtain interpolated tap 910. Interpolation may include, for example, averaging the values of two consecutive taps. Interpolated tap 908 may be separated in time from tap 902 by an interpolation offset 912 ($\Delta t_0$). The interpolation offset 912 may be the time interval between tap 902 and interpolated tap 908. The window offset $W_{offset}$ may be zero or nonzero.

Depending on the size and position of the window, the CIR report may include the values of interpolated tap 908 and interpolated tap 910 (e.g., at points $t_0^{int}$, $t_0^{int}+T$, $t_0^{int}+2T$, ...). The CIR report may also include the values of tap 904 and tap 906. In some aspects, the CIR report may not include the values of interpolated tap 908 and interpolated tap 910 (e.g., at points $t_0$, $t_0+T$, $t_0+2T$, ...). However, the earliest tap (interpolated tap 908) may be based on interpolation for ranging purposes. The CIR report may include an interpolation offset ($\Delta t_0$) from the grid. When the window offset $W_{offset}$ is nonzero, the sampling time occasions may be shifted by $W_{offset}$. In some aspects, the CIR report includes only the first interpolated tap, such as interpolated tap 908. This may save on complexity or reporting overhead.

As indicated above, FIG. 9 is provided as an example. Other examples may differ from what is described with regard to FIG. 9.

Figure 10:
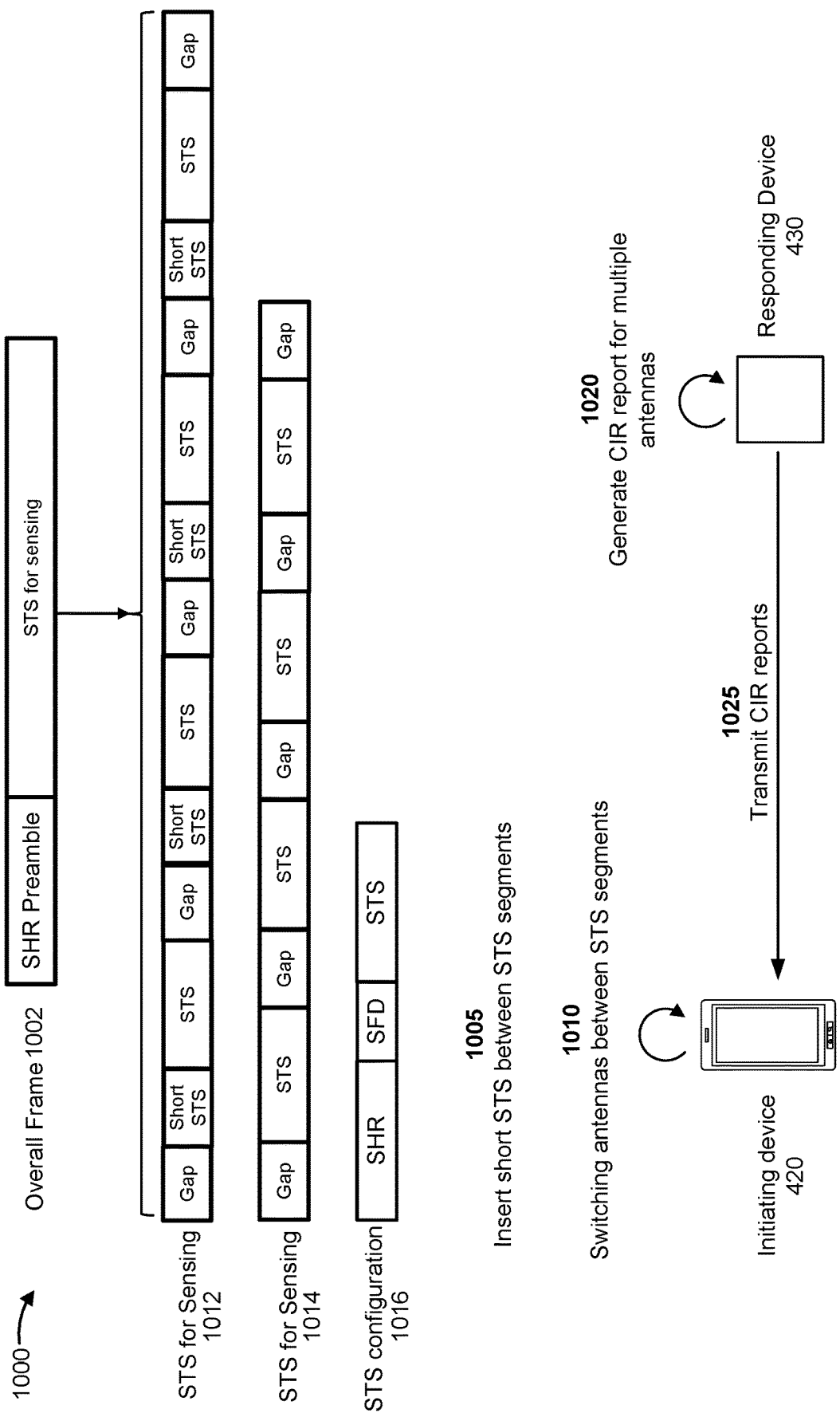
FIG. 10 is a diagram illustrating an example of generating CIR reports for multiple antennas, in accordance with the present disclosure.

FIG. 10 is a diagram illustrating an example 1000 of generating CIR reports for multiple antennas, in accordance with the present disclosure.

A sensing device, such as the initiating device 420 or the responding device 430, may transmit packets for ranging or sensing from multiple transmit antennas. Each packet may have a frame 1002 that includes a synchronization header (SHR), a start-of-frame delimiter (SFD), and a scrambled timestamp sequence (STS) that can be used for ranging or sensing. An SHR preamble may include a synchronization (SYNC) portion and an SFD. One or more antennas of the sensing device may transmit the preamble simultaneously, and multiple antennas may transmit the STS sensing part (each STS segment by one antenna). In some aspects, as shown by reference number 1005, a sensing device (e.g., initiating device 420) may insert a short STS sequence between STS segments for automatic gain control (AGC) settling. The antenna switching is shown by sensing timeline 1012. As shown by reference number 1010, the initiating device 420 may switch antennas during STS gaps between the STS segments. Each STS gap may be long enough in duration for antenna switching.

Alternatively, the initiating device 420 may not add a short STS sequence, as shown by sensing timeline 1014. The AGC may be set using the memory of previous AGC settings or values for the same antenna index. The information about which antenna sequence is to be used may be included in the preamble and may be determined through negotiation.

In some aspects, the initiating device 420 may switch between different STS packets. An STS packet configuration 1016 for each packet from the different antennas may include an the SHR, the SFD, and the STS.

As shown by reference number 1020, the responding device 430 may generate a CIR report for the CIR at each receive antenna. The CIR report format for individual antennas may be negotiated. As shown by reference number 1025, the responding device 430 may transmit CIR reports for the receive antennas. The responding device 430 may use a common reference point for tap selection windows and for interpolation. In some aspects, the responding device 430 may determine, after any interpolation, the earliest arrival path (EAP) for each antenna and select the common reference point based at least in part on the strongest antenna (based on CIR energy), a median of the antennas' EAPs (more immune to outlier EAP measurements), or an average of estimated EAPs. The responding device 430 may also sum powers or amplitudes of CIR taps and determine the EAP based on interpolation of the CIR taps. Alternatively, the responding device 430 may determine a first tap and transmit an indication of a time offset for a CIR of each antenna relative to the first tap (to avoid interpolation).

Alternatively, the responding device 430 may also transmit a first antenna CIR with an angle of arrival (AoA) of all or a subset of taps. For AoA analysis, the responding device 430 may include receive chain angle and latency calibration results in the CIR report for compensation by an upper layer of the initiating device 420. This may conserve processing resources as the responding device 430 that would be consumed by extra interpolation over the antenna CIRs.

As indicated above, FIG. 10 is provided as an example. Other examples may differ from what is described with regard to FIG. 10.

Figure 11:
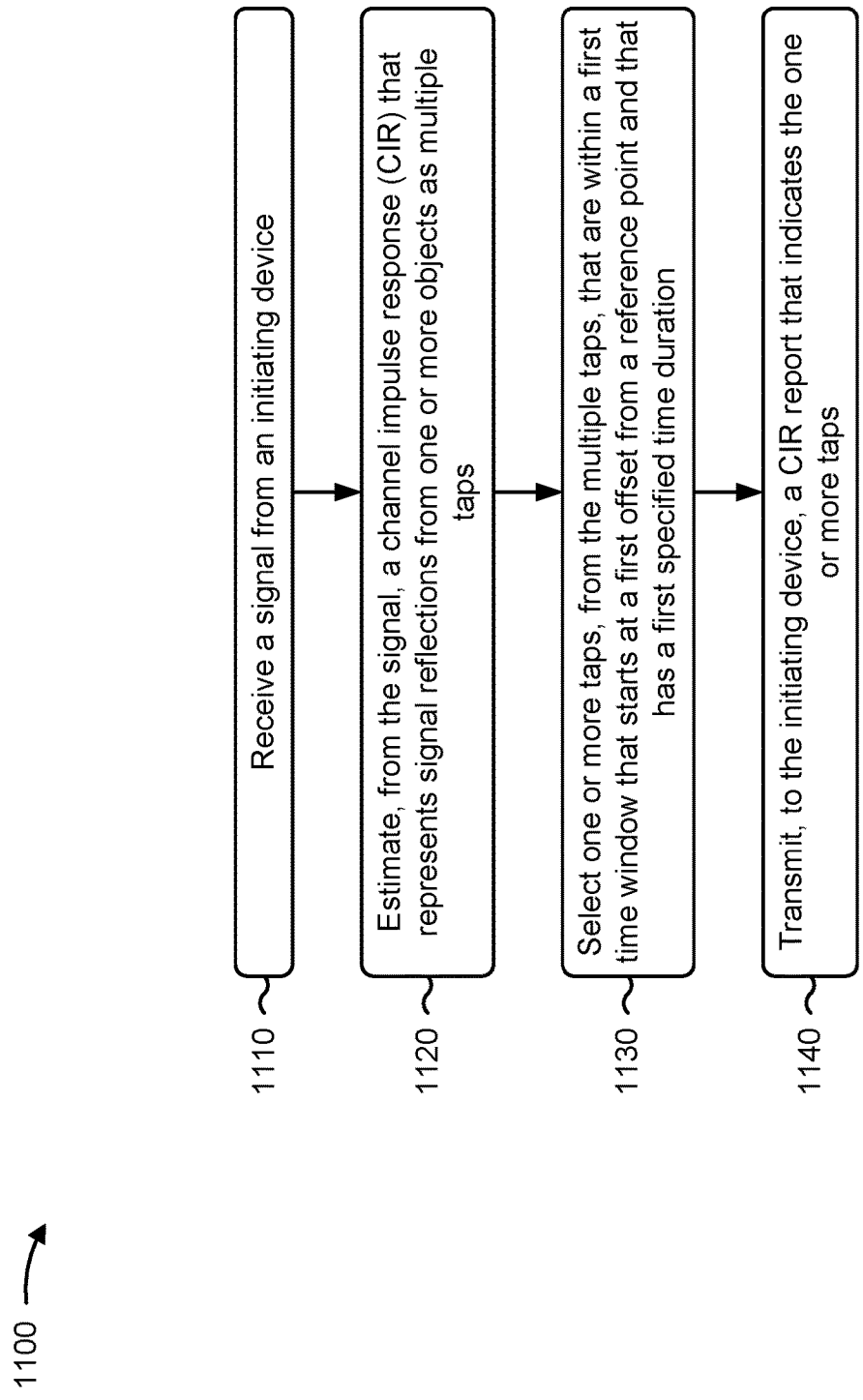
FIG. 11 is a diagram illustrating an example process performed, for example, by a responding device, in accordance with the present disclosure.

FIG. 11 is a diagram illustrating an example process 1100 performed, for example, by a responding device, in accordance with the present disclosure. Example process 1100 is an example where the responding device (e.g., responding device 430) performs operations associated with RF sensing with a CIR.

As shown in FIG. 11, in some aspects, process 1100 may include receiving a signal from an initiating device (block 1110). For example, the responding device (e.g., using communication manager 1308 and/or reception component 1302 depicted in FIG. 13) may receive a signal from an initiating device, as described above.

As further shown in FIG. 11, in some aspects, process 1100 may include estimating, from the signal, a CIR that represents signal reflections from one or more objects as multiple taps (block 1120). For example, the responding device (e.g., using communication manager 1308 and/or estimation component 1310 depicted in FIG. 13) may estimate, from the signal, a CIR that represents signal reflections from one or more objects as multiple taps, as described above.

As further shown in FIG. 11, in some aspects, process 1100 may include selecting one or more taps, from the multiple taps, that are within a first time window that starts at a first offset from a reference point and that has a first specified time duration (block 1130). For example, the responding device (e.g., using communication manager 1308 and/or selection component 1312 depicted in FIG. 13) may select one or more taps, from the multiple taps, that are within a first time window that starts at a first offset from a reference point and that has a first specified time duration, as described above.

As further shown in FIG. 11, in some aspects, process 1100 may include transmitting, to the initiating device, a CIR report that indicates the one or more taps (block 1140). For example, the responding device (e.g., using communication manager 1308 and/or transmission component 1304 depicted in FIG. 13) may transmit, to the initiating device, a CIR report that indicates the one or more taps, as described above.

Process 1100 may include additional aspects, such as any single aspect or any combination of aspects described below and/or in connection with one or more other processes described elsewhere herein.

In a first aspect, the first offset is based at least in part on a transmission time and a reference time associated with a sensing range of interest.

In a second aspect, alone or in combination with the first aspect, process 1100 includes negotiating the reference point with one or more sensing devices.

In a third aspect, alone or in combination with one or more of the first and second aspects, the reference point includes an earliest tap, a strongest tap, a packet detection time, or a center of mass for the multiple taps.

In a fourth aspect, alone or in combination with one or more of the first through third aspects, selecting the one or more taps includes selecting the one or more taps from within the first time window and a second time window having a second specified time duration and a second offset.

In a fifth aspect, alone or in combination with one or more of the first through fourth aspects, process 1100 includes negotiating, with a sensing device, one or more of the first specified time duration, a starting point of the first time window, the second specified time duration, a starting point of the second time window, or a quantity of time windows.

In a sixth aspect, alone or in combination with one or more of the first through fifth aspects, process 1100 includes receiving, from one or more sensing devices, one or more of a supported window time duration or a supported quantity of windows.

In a seventh aspect, alone or in combination with one or more of the first through sixth aspects, process 1100 includes negotiating, among sensing devices, one or more of the first specified time duration, the reference point, or the first offset.

In an eighth aspect, alone or in combination with one or more of the first through seventh aspects, process 1100 includes selecting one or more of the first specified time duration, the reference point, or the first offset based at least in part on a range of interest.

In a ninth aspect, alone or in combination with one or more of the first through eighth aspects, the multiple taps are at non-interpolated sampling time occasions, and selecting the one or more taps from the multiple taps includes generating, by interpolation, one or more interpolated taps between consecutive taps of the multiple taps.

In a tenth aspect, alone or in combination with one or more of the first through ninth aspects, a first interpolated tap of the one or more interpolated taps is separated in time from a non-interpolated sampling occasion by an interpolation offset, and wherein the interpolation offset is included in the CIR report.

In an eleventh aspect, alone or in combination with one or more of the first through tenth aspects, the one or more interpolated taps includes only the first interpolated tap.

In a twelfth aspect, alone or in combination with one or more of the first through eleventh aspects, the first specified time duration is based at least in part on a sensing spread of interest from the initiating device to the one or more objects and from the one or more objects to the responding device.

In a thirteenth aspect, alone or in combination with one or more of the first through twelfth aspects, a sampling rate for the one or more taps is based at least in part on a UWB chip rate or a multiple of the UWB chip rate.

In a fourteenth aspect, alone or in combination with one or more of the first through thirteenth aspects, process 1100 includes negotiating, with a sensing device or the initiating device, a quantity of bits for representing quantized values of the one or more taps in the CIR report.

In a fifteenth aspect, alone or in combination with one or more of the first through fourteenth aspects, the CIR report indicates, for each tap in the CIR report, an IQ value.

In a sixteenth aspect, alone or in combination with one or more of the first through fifteenth aspects, for each tap in the CIR report, the IQ value may be normalized with a normalization factor to a greatest IQ value, and the normalization factor is included in the CIR report. In some aspects, the IQ value may be normalized to a greatest IQ value.

In a seventeenth aspect, alone or in combination with one or more of the first through sixteenth aspects, receiving the signal includes receiving the signal at multiple receive antennas.

In an eighteenth aspect, alone or in combination with one or more of the first through seventeenth aspects, transmitting the CIR report includes transmitting a CIR report for each antenna of multiple receive antennas, and the reference point is a common reference point among the multiple receive antennas.

In a nineteenth aspect, alone or in combination with one or more of the first through eighteenth aspects, the common reference point is based at least in part on an earliest arrival path of an antenna among the multiple receive antennas with a strongest energy signal.

In a twentieth aspect, alone or in combination with one or more of the first through nineteenth aspects, the common reference point is based at least in part on a median of estimated time for the earliest arrival paths for the multiple receive antennas.

In a twenty-first aspect, alone or in combination with one or more of the first through twentieth aspects, the common reference point is based at least in part on an average of estimated time for the earliest arrival paths for the multiple receive antennas.

In a twenty-second aspect, alone or in combination with one or more of the first through twenty-first aspects, the common reference point is based at least in part on adding powers or amplitudes of multiple antenna CIRs and an estimation of an earliest arrival path for the multiple receive antennas based at least in part on interpolation from a combined CIR.

In a twenty-third aspect, alone or in combination with one or more of the first through twenty-second aspects, process 1100 includes transmitting an indication of a time offset for a CIR of each antenna relative to the common reference point.

In a twenty-fourth aspect, alone or in combination with one or more of the first through twenty-third aspects, transmitting the CIR report includes transmitting the CIR report for a first antenna and an indication of an angle of arrival for each of the one or more taps.

In a twenty-fifth aspect, alone or in combination with one or more of the first through twenty-fourth aspects, process 1100 includes switching antennas during STS gaps between STS segments, where each STS segment has an STS sensing part transmitted by an antenna of multiple transmit antennas, and inserting short STS sequences between the STS segments for settling of an AGC value.

In a twenty-sixth aspect, alone or in combination with one or more of the first through twenty-fifth aspects, process 1100 includes switching antennas during STS gaps between STS segments, where each STS segment has an STS sensing part transmitted by an antenna of multiple transmit antennas, and setting an AGC value for each STS segment based at least in part on previous AGC values.

In a twenty-seventh aspect, alone or in combination with one or more of the first through twenty-sixth aspects, process 1100 includes negotiating an antenna sequence to be included in preambles of the STS segments.

In a twenty-eighth aspect, alone or in combination with one or more of the first through twenty-seventh aspects, process 1100 includes switching antennas between STS packets.

In a twenty-ninth aspect, alone or in combination with one or more of the first through twenty-eighth aspects, the one or more CIR reports correspond to multiple receive antennas.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
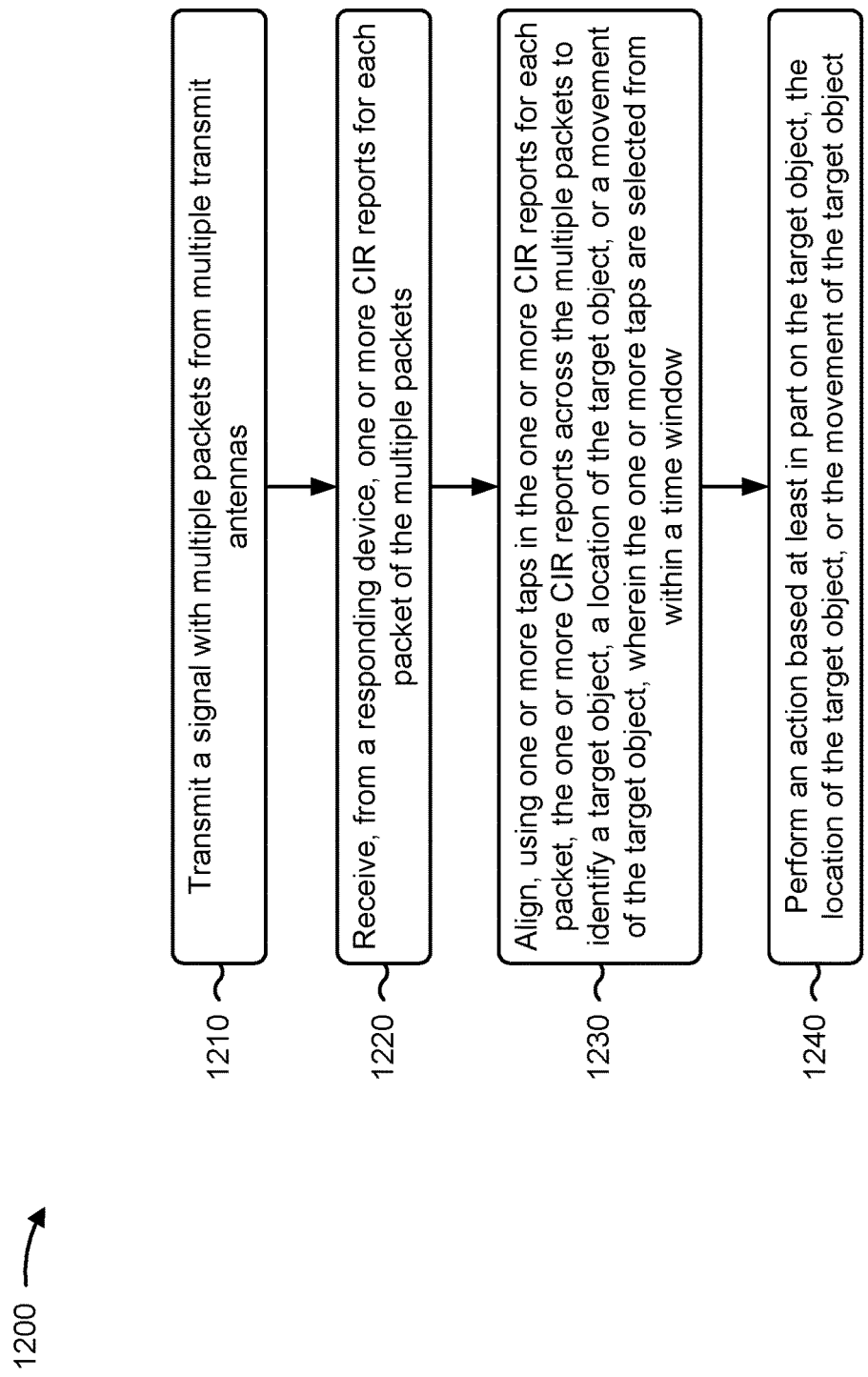
FIG. 12 is a diagram illustrating an example process performed, for example, by an initiating device, in accordance with the present disclosure.

FIG. 12 is a diagram illustrating an example process 1200 performed, for example, by an initiating device, in accordance with the present disclosure. Example process 1200 is an example where the initiating device (e.g., initiating device 420) performs operations associated with RF sensing with a CIR.

As shown in FIG. 12, in some aspects, process 1200 may include transmitting a signal with multiple packets from multiple transmit antennas (block 1210). For example, the initiating device (e.g., using communication manager 1408 and/or transmission component 1404 depicted in FIG. 14) may transmit a signal with multiple packets from multiple transmit antennas, as described above.

As further shown in FIG. 12, in some aspects, process 1200 may include receiving, from a responding device, one or more CIR reports for each packet of the multiple packets (block 1220). For example, the initiating device (e.g., using communication manager 1408 and/or reception component 1402 depicted in FIG. 14) may receive, from a responding device, one or more CIR reports for each packet of the multiple packets, as described above.

As further shown in FIG. 12, in some aspects, process 1200 may include aligning, using one or more taps in the one or more CIR reports for each packet, the one or more CIR reports across the multiple packets to identify a target object, a location of the target object, or a movement of the target object, where the one or more taps are selected from within a time window (block 1230). For example, the initiating device (e.g., using communication manager 1408 and/or alignment component 1410 depicted in FIG. 14) may align, using one or more taps in the one or more CIR reports for each packet, the one or more CIR reports across the multiple packets to identify a target object, a location of the target object, or a movement of the target object, where the one or more taps are selected from within a time window, as described above.

As further shown in FIG. 12, in some aspects, process 1200 may include performing an action based at least in part on the target object, the location of the target object, or the movement of the target object (block 1240). For example, the initiating device (e.g., using communication manager 1408 and/or action component 1412 depicted in FIG. 14) may perform an action based at least in part on the target object, the location of the target object, or the movement of the target object, as described above.

Process 1200 may include additional aspects, such as any single aspect or any combination of aspects described below and/or in connection with one or more other processes described elsewhere herein.

In a first aspect, process 1200 includes switching antennas during STS gaps between STS segments, where each STS segment has an STS sensing part transmitted by an antenna of the multiple transmit antennas, and inserting short STS sequences between the STS segments for settling of an AGC value.

In a second aspect, alone or in combination with the first aspect, process 1200 includes switching antennas during STS gaps between STS segments, where each STS segment has an STS sensing part transmitted by an antenna of the multiple transmit antennas, and setting an AGC value for each STS segment based at least in part on previous AGC values.

In a third aspect, alone or in combination with one or more of the first and second aspects, process 1200 includes negotiating, with the responding device, an antenna sequence to be included in preambles of the STS segments.

In a fourth aspect, alone or in combination with one or more of the first through third aspects, process 1200 includes switching antennas between packets.

In a fifth aspect, alone or in combination with one or more of the first through fourth aspects, process 1200 includes negotiating, with the responding device, one or more of a specified time duration for the time window, a reference point for the time window, an offset for the time window, or a quantity of bits for a CIR report.

In a sixth aspect, alone or in combination with one or more of the first through fifth aspects, the one or more CIR reports correspond to multiple receive antennas.

In a seventh aspect, alone or in combination with one or more of the first through fifth aspects, process 1200 includes receiving a reflected signal at one or more receive antennas (e.g., multiple receive antennas), estimating one or more CIR that represent signal reflections from one or more objects as multiple taps for each receive antenna, selecting one or more taps, from the multiple taps, that are within a time window that starts at an offset from a reference point and that has a specified time duration, and generating a CIR report for each antenna of the one or more receive antennas, where the reference point is a common reference point among the one or more receive antennas.

In an eighth aspect, alone or in combination with one or more of the first through seventh aspects, the common reference point is based at least in part on an earliest arrival path of an antenna among the one or more receive antennas with a strongest energy signal.

In a ninth aspect, alone or in combination with one or more of the first through eighth aspects, the common reference point is based at least in part on a median of estimated time for the earliest arrival paths for the one or more receive antennas.

In a tenth aspect, alone or in combination with one or more of the first through ninth aspects, the common reference point is based at least in part on an average of estimated time for the earliest arrival paths for the one or more receive antennas.

In an eleventh aspect, alone or in combination with one or more of the first through tenth aspects, the common reference point is based at least in part on adding powers or amplitudes of multiple antenna CIRs and an estimation of an earliest arrival path for the one or more receive antennas based at least in part on interpolation from a combined CIR.

In a twelfth aspect, alone or in combination with one or more of the first through eleventh aspects, process 1200 includes transmitting an indication of a time offset for a CIR of each antenna relative to the common reference point.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
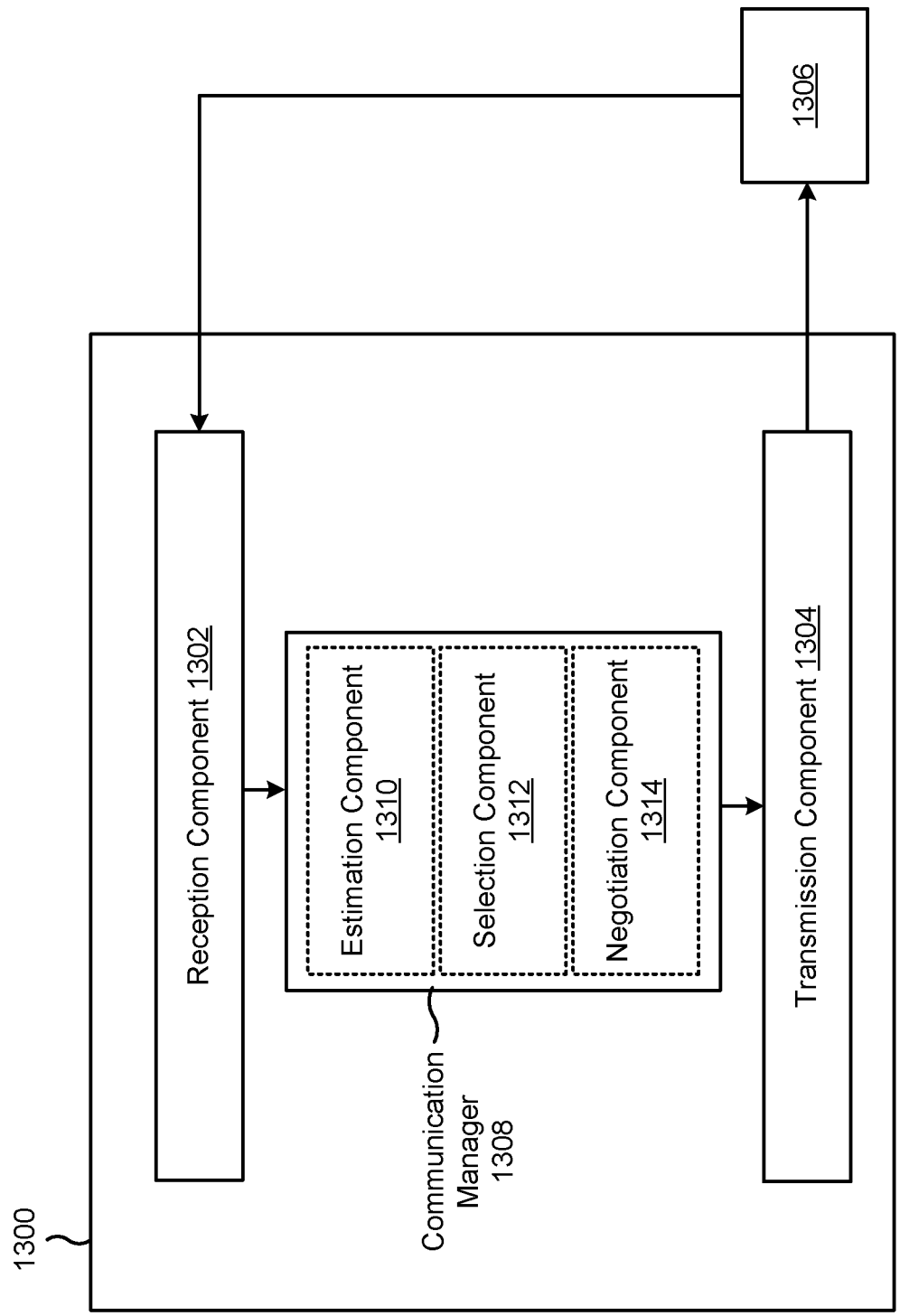
FIGS. 13-14 are diagrams of example apparatuses for wireless communication, in accordance with the present disclosure.

FIG. 13 is a diagram of an example apparatus 1300 for wireless communication. The apparatus 1300 may be a responding device (e.g., responding device 430), or a responding device may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, AP, UWB device, sensing device, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the UE or network entity described in connection with FIG. 2. The communication manager 1308 may be, or be similar to, the communication manager 140 or 150 depicted in FIGS. 1 and 2. For example, in some aspects, the communication manager 1308 may be configured to perform one or more of the functions described as being performed by the communication manager 140 or 150. In some aspects, the communication manager 1308 may include the reception component 1302 and/or the transmission component 1304. The communication manager 1308 may include an estimation component 1310, a selection component 1312, or a negotiation component 1314, among other examples.

In some aspects, the apparatus 1300 may be configured to perform one or more operations described herein in connection with FIGS. 1-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the responding device described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the responding device described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the responding device described in connection with FIG. 2. In some aspects, the transmission component 1304 may be co-located with the reception component 1302 in a transceiver.

The reception component 1302 may receive a signal from an initiating device. The estimation component 1310 may estimate, from the signal, a CIR that represents signal reflections from one or more objects as multiple taps. The selection component 1312 may select one or more taps, from the multiple taps, that are within a first time window that starts at a first offset from a reference point and that has a first specified time duration. The transmission component 1304 may transmit, to the initiating device, a CIR report that indicates the one or more taps.

The negotiation component 1314 may negotiate the reference point with one or more sensing devices. The negotiation component 1314 may negotiate, with a sensing device, one or more of the first specified time duration, a starting point of the first time window, the second specified time duration, a starting point of the second time window, or a quantity of time windows.

The reception component 1302 may receive, from one or more sensing devices, one or more of a supported window time duration or a supported quantity of windows. The negotiation component 1314 may negotiate, among sensing devices, one or more of the first specified time duration, the reference point, or the first offset. The selection component 1312 may select one or more of the first specified time duration, the reference point, or the first offset based at least in part on a range of interest. The negotiation component 1314 may negotiate, with a sensing device or the initiating device, a quantity of bits for representing quantized values of the one or more taps in the CIR report. The negotiation component 1314 may negotiate an antenna sequence to be included in preambles of the STS segments.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
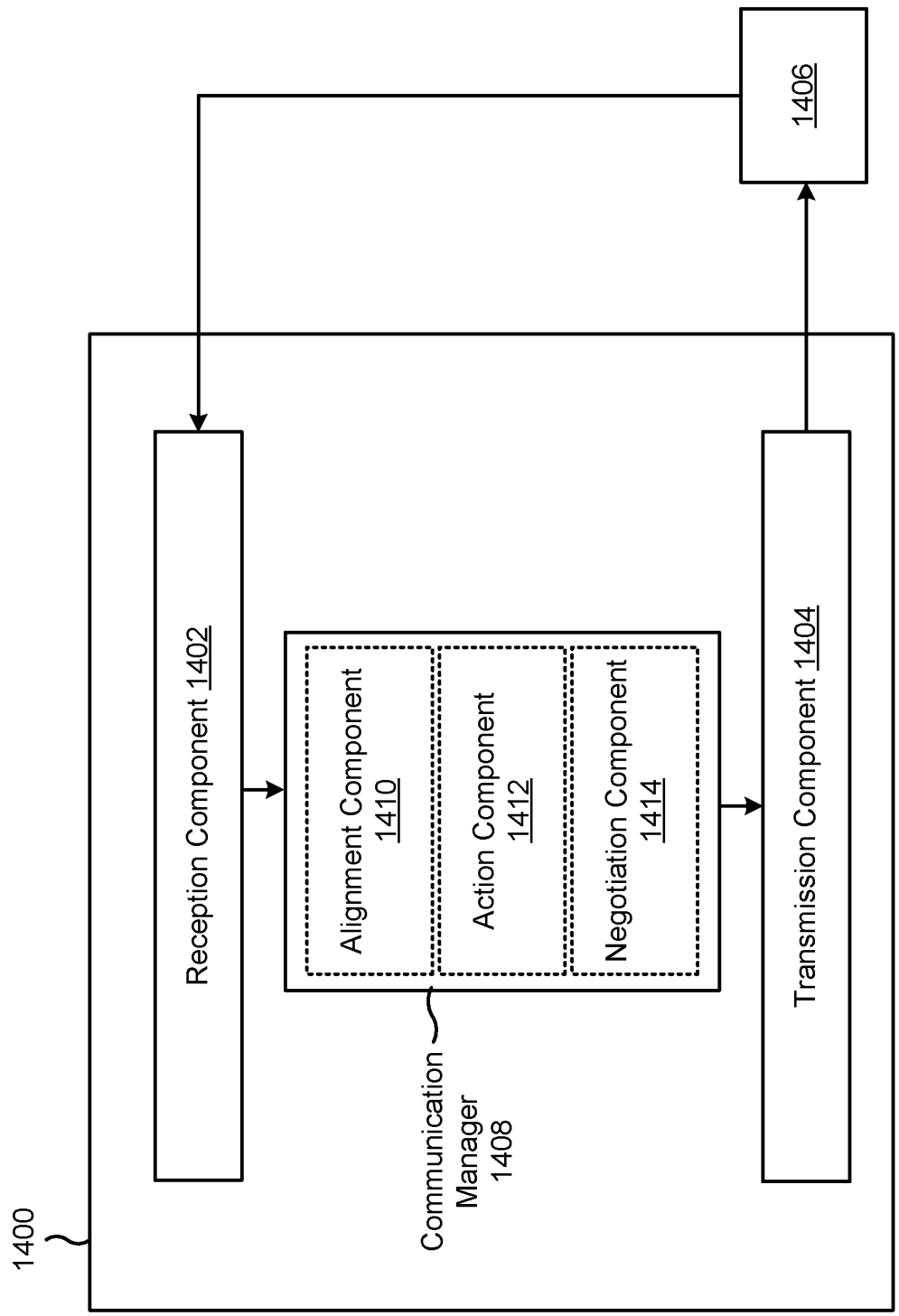

FIG. 14 is a diagram of an example apparatus 1400 for wireless communication. The apparatus 1400 may be an initiating device, or an initiating device may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, AP, UWB device, or another wireless communication device) using the reception component 1402 and the transmission component 1404. As further shown, the apparatus 1400 may include the communication manager 1408. The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the UE or network entity described in connection with FIG. 2. The communication manager 1408 may be, or be similar to, the communication manager 140 or 150 depicted in FIGS. 1 and 2. For example, in some aspects, the communication manager 1408 may be configured to perform one or more of the functions described as being performed by the communication manager 140 or 150. In some aspects, the communication manager 1408 may include the reception component 1402 and/or the transmission component 1404. The communication manager 1408 may include an alignment component 1410, an action component 1412, and/or a negotiation component 1414, among other examples.

In some aspects, the apparatus 1400 may be configured to perform one or more operations described herein in connection with FIGS. 1-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the initiating device described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the initiating device described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the initiating device described in connection with FIG. 2. In some aspects, the transmission component 1404 may be co-located with the reception component 1402 in a transceiver.

The transmission component 1404 may transmit a signal with multiple packets from multiple transmit antennas. The reception component 1402 may receive, from a responding device, one or more CIR reports for each packet of the multiple packets. The alignment component 1410 may align, using one or more taps in the one or more CIR reports for each packet, the one or more CIR reports across the multiple packets to identify a target object, a location of the target object, or a movement of the target object, wherein the one or more taps are selected from within a time window. The action component 1412 may perform an action based at least in part on the target object, the location of the target object, or the movement of the target object.

The negotiation component 1414 may negotiate, with the responding device, an antenna sequence to be included in preambles of the STS segments. The negotiation component 1414 may negotiate, with the responding device, one or more of a specified time duration for the time window, a reference point for the time window, an offset for the time window, or a quantity of bits for a CIR report.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a responding device, comprising: receiving a signal from an initiating device; estimating, from the signal, a channel impulse response (CIR) that represents signal reflections from one or more objects as multiple taps; selecting one or more taps, from the multiple taps, that are within a first time window that starts at a first offset from a reference point and that has a first specified time duration; and transmitting, to the initiating device, a CIR report that indicates the one or more taps.

Aspect 2: The method of Aspect 1, wherein the first offset is based at least in part on a transmission time and a reference time associated with a sensing range of interest.

Aspect 3: The method of Aspect 1 or 2, further comprising negotiating the reference point with one or more sensing devices.

Aspect 4: The method of any of Aspects 1-3, wherein the reference point includes an earliest tap, a strongest tap, a packet detection time, or a center of mass for the multiple taps.

Aspect 5: The method of any of Aspects 1-4, wherein selecting the one or more taps includes selecting the one or more taps from within the first time window and a second time window having a second specified time duration and a second offset.

Aspect 6: The method of Aspect 5, further comprising negotiating, with a sensing device, one or more of the first specified time duration, a starting point of the first time window, the second specified time duration, a starting point of the second time window, or a quantity of time windows.

Aspect 7: The method of Aspect 5 or 6, further comprising receiving, from one or more sensing devices, one or more of a supported window time duration or a supported quantity of windows.

Aspect 8: The method of any of Aspects 5-7, further comprising negotiating, among sensing devices, one or more of the first specified time duration, the reference point, or the first offset.

Aspect 9: The method of any of Aspects 5-8, further comprising selecting one or more of the first specified time duration, the reference point, or the first offset based at least in part on a range of interest.

Aspect 10: The method of any of Aspects 5-9, wherein the multiple taps are at non-interpolated sampling time occasions, and wherein selecting the one or more taps from the multiple taps includes generating, by interpolation, one or more interpolated taps between consecutive taps of the multiple taps.

Aspect 11: The method of Aspect 10, wherein a first interpolated tap of the one or more interpolated taps is separated in time from a non-interpolated sampling occasion by an interpolation offset, and wherein the interpolation offset is included in the CIR report.

Aspect 12: The method of Aspect 11, wherein the one or more interpolated taps includes only the first interpolated tap.

Aspect 13: The method of any of Aspects 1-11, wherein the first specified time duration is based at least in part on a sensing spread of interest from the initiating device to the one or more objects and from the one or more objects to the responding device.

Aspect 14: The method of any of Aspects 1-12, wherein a sampling rate for the one or more taps is based at least in part on a UWB chip rate or a multiple of the UWB chip rate.

Aspect 15: The method of any of Aspects 1-14, further comprising negotiating, with a sensing device or the initiating device, a quantity of bits for representing quantized values of the one or more taps in the CIR report.

Aspect 16: The method of any of Aspects 1-15, wherein the CIR report indicates, for each tap in the CIR report, an in-phase and quadrature value.

Aspect 17: The method of Aspect 16, wherein for each tap in the CIR report, the in-phase and quadrature value may be normalized with a normalization factor to a greatest in-phase and quadrature value, and wherein the normalization factor is included in the CIR report.

Aspect 18: The method of any of Aspects 1-17, wherein receiving the signal includes receiving the signal at multiple receive antennas.

Aspect 19: The method of any of Aspects 1-19, wherein transmitting the CIR report includes transmitting a CIR report for each antenna of multiple receive antennas, and wherein the reference point is a common reference point among the multiple receive antennas.

Aspect 20: The method of Aspect 19, wherein the common reference point is based at least in part on an earliest arrival path of an antenna among the multiple receive antennas with a strongest energy signal.

Aspect 21: The method of Aspect 19 or 20, wherein the common reference point is based at least in part on a median of estimated time for the earliest arrival paths for the multiple receive antennas.

Aspect 22: The method of any of Aspects 19-21, wherein the common reference point is based at least in part on an average of estimated time for the earliest arrival paths for the multiple receive antennas.

Aspect 23: The method of any of Aspects 19-22, wherein the common reference point is based at least in part on adding powers or amplitudes of multiple antenna CIRs and an estimation of an earliest arrival path for the multiple receive antennas based at least in part on interpolation from a combined CIR.

Aspect 24: The method of any of Aspects 19-23, further comprising transmitting an indication of a time offset for a CIR of each antenna relative to the common reference point.

Aspect 25: The method of any of Aspects 1-24, wherein transmitting the CIR report includes transmitting the CIR report for a first antenna and an indication of an angle of arrival for each of the one or more taps.

Aspect 26: The method of any of Aspects 1-25, further comprising: switching antennas during scrambled timestamp sequence (STS) gaps between STS segments, wherein each STS segment has an STS sensing part transmitted by an antenna of multiple transmit antennas; and inserting short STS sequences between the STS segments for settling of an automatic gain control (AGC) value.

Aspect 27: The method of any of Aspects 1-25, further comprising: switching antennas during scrambled timestamp sequence (STS) gaps between STS segments, wherein each STS segment has an STS sensing part transmitted by an antenna of multiple transmit antennas; and setting an automatic gain control (AGC) value for each STS segment based at least in part on previous AGC values.

Aspect 28: The method of any of Aspects 1-27, further comprising negotiating an antenna sequence to be included in preambles of the STS segments.

Aspect 29: The method of any of Aspects 1-28, further comprising switching antennas between scrambled timestamp sequence (STS) packets.

Aspect 30: The method of any of Aspects 1-29, wherein the one or more CIR reports correspond to multiple receive antennas.

Aspect 31: A method of wireless communication performed by an initiating device, comprising: transmitting a signal with multiple packets from multiple transmit antennas; receiving, from a responding device, one or more channel impulse response (CIR) reports for each packet of the multiple packets; aligning, using one or more taps in the one or more CIR reports for each packet, the one or more CIR reports across the multiple packets to identify a target object, a location of the target object, or a movement of the target object, wherein the one or more taps are selected from within a time window; and performing an action based at least in part on the target object, the location of the target object, or the movement of the target object.

Aspect 32: The method of Aspect 31, further comprising: switching antennas during scrambled timestamp sequence (STS) gaps between STS segments, wherein each STS segment has an STS sensing part transmitted by an antenna of the multiple transmit antennas; and inserting short STS sequences between the STS segments for settling of an automatic gain control (AGC) value.

Aspect 33: The method of Aspect 31 or 32, further comprising: switching antennas during scrambled timestamp sequence (STS) gaps between STS segments, wherein each STS segment has an STS sensing part transmitted by an antenna of the multiple transmit antennas; and setting an automatic gain control (AGC) value for each STS segment based at least in part on previous AGC values.

Aspect 34: The method of any of Aspects 31-33, further comprising negotiating, with the responding device, an antenna sequence to be included in preambles of the STS segments.

Aspect 35: The method of any of Aspects 31-34, further comprising switching antennas between packets.

Aspect 36: The method of any of Aspects 31-35, further comprising negotiating, with the responding device, one or more of a specified time duration for the time window, a reference point for the time window, an offset for the time window, or a quantity of bits for a CIR report.

Aspect 37: The method of any of Aspects 31-36, wherein the one or more CIR reports correspond to multiple receive antennas.

Aspect 38: The method of any of Aspects 31-37, further comprising receiving a reflected signal at one or more receive signals; estimating one or more CIR that represent signal reflections from one or more objects as multiple taps for each receive antenna; selecting one or more taps, from the multiple taps, that are within a time window that starts at an offset from a reference point and that has a specified time duration; and generating a CIR report for each antenna of the one or more receive antennas, wherein the reference point is a common reference point among the one or more receive antennas.

Aspect 39: The method of any of Aspects 31-37, wherein the common reference point is based at least in part on an earliest arrival path of an antenna among the one or more receive antennas with a strongest energy signal.

Aspect 40: The method of any of Aspects 31-37, wherein the common reference point is based at least in part on a median of estimated time for the earliest arrival paths for the one or more receive antennas.

Aspect 41: The method of any of Aspects 31-37, wherein the common reference point is based at least in part on an average of estimated time for the earliest arrival paths for the one or more receive antennas.

Aspect 42: The method of any of Aspects 31-37, wherein the common reference point is based at least in part on adding powers or amplitudes of multiple antenna CIRs and an estimation of an earliest arrival path for the one or more receive antennas based at least in part on interpolation from a combined CIR.

Aspect 43: The method of any of Aspects 31-37, further comprising transmitting an indication of a time offset for a CIR of each antenna relative to the common reference point.

Aspect 44: An apparatus for wireless communication at a device, comprising a processor; memory coupled with the processor; and instructions stored in the memory and executable by the processor to cause the apparatus to perform the method of one or more of Aspects 1-43.

Aspect 45: A device for wireless communication, comprising a memory and one or more processors coupled to the memory, the one or more processors configured to perform the method of one or more of Aspects 1-43.

Aspect 46: An apparatus for wireless communication, comprising at least one means for performing the method of one or more of Aspects 1-43.

Aspect 47: A non-transitory computer-readable medium storing code for wireless communication, the code comprising instructions executable by a processor to perform the method of one or more of Aspects 1-43.

Aspect 48: A non-transitory computer-readable medium storing a set of instructions for wireless communication, the set of instructions comprising one or more instructions that, when executed by one or more processors of a device, cause the device to perform the method of one or more of Aspects 1-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A responding device for wireless communication, comprising:
   one or more memories; and
   one or more processors, coupled to the one or more memories, configured to:
   receive a signal from an initiating device;
   estimate, from the signal, a channel impulse response (CIR) that represents signal reflections from one or more objects as multiple taps;
   select one or more taps, from the multiple taps, that are within a first time window that starts at a first offset from a reference point and that has a first specified time duration; and
   transmit, to the initiating device, a CIR report that indicates the one or more taps, wherein the CIR report includes the first specified time duration and the first offset.

2. The responding device of claim 1, wherein the first offset is based at least in part on a transmission time and a reference time associated with a sensing range of interest.

3. The responding device of claim 1, wherein the one or more processors are configured to negotiate the reference point with one or more sensing devices.

4. The responding device of claim 1, wherein the reference point includes an earliest tap, a strongest tap, a packet detection time, or a center of mass for the multiple taps.

5. The responding device of claim 1, wherein the one or more processors, to select the one or more taps, are configured to select the one or more taps from within the first time window and a second time window having a second specified time duration and a second offset.

6. The responding device of claim 5, wherein the one or more processors are configured to negotiate, with a sensing device, one or more of the first specified time duration, a starting point of the first time window, the second specified time duration, a starting point of the second time window, or a quantity of time windows.

7. The responding device of claim 5, wherein the one or more processors are configured to receive, from one or more sensing devices, one or more of a supported window time duration or a supported quantity of windows.

8. The responding device of claim 5, wherein the one or more processors are configured to:
negotiate, among sensing devices, one or more of the first specified time duration, the reference point, or the first offset; and
select one or more of the first specified time duration, the reference point, or the first offset based at least in part on a range of interest.

9. The responding device of claim 5, wherein the multiple taps are at non-interpolated sampling time occasions, and wherein selecting the one or more taps from the multiple taps includes generating, by interpolation, one or more interpolated taps between consecutive taps of the multiple taps.

10. The responding device of claim 9, wherein a first interpolated tap of the one or more interpolated taps is separated in time from a non-interpolated sampling occasion by an interpolation offset, and wherein the interpolation offset is included in the CIR report.

11. The responding device of claim 1, wherein a sampling rate for the one or more taps is based at least in part on a UWB chip rate or a multiple of the UWB chip rate.

12. The responding device of claim 1, wherein the one or more processors are configured to negotiate, with a sensing device or the initiating device, a quantity of bits for representing quantized values of the one or more taps in the CIR report.

13. The responding device of claim 1, wherein the CIR report indicates, for each tap in the CIR report, an in-phase and quadrature value, wherein for each tap in the CIR report, the in-phase and quadrature value may be normalized with a normalization factor, and wherein the normalization factor is included in the CIR report.

14. The responding device of claim 1, wherein the one or more processors, to receive the signal, are configured to receive the signal at multiple receive antennas, wherein transmitting the CIR report includes transmitting a CIR report for each antenna of the multiple receive antennas, and wherein the reference point is a common reference point among the multiple receive antennas.

15. The responding device of claim 14, wherein the common reference point is based at least in part on an earliest arrival path of an antenna among the multiple receive antennas with a strongest energy signal.

16. The responding device of claim 14, wherein the common reference point is based at least in part on a median or an average of estimated time for earliest arrival paths for the multiple receive antennas.

17. The responding device of claim 14, wherein the common reference point is based at least in part on adding powers or amplitudes of multiple antenna CIRs and an estimation of an earliest arrival path for the multiple receive antennas based at least in part on interpolation from a combined CIR.

18. The responding device of claim 14, wherein the one or more processors are configured to transmit an indication of a time offset for a CIR of each antenna relative to the common reference point.

19. The responding device of claim 1, wherein the one or more processors, to transmit the CIR report, are configured to transmit the CIR report for a first antenna and an indication of an angle of arrival for each of the one or more taps.

20. The responding device of claim 1, wherein the one or more processors are configured to:
switch antennas during scrambled timestamp sequence (STS) gaps between STS segments, wherein each STS segment has an STS sensing part transmitted by an antenna of multiple transmit antennas; and
insert short STS sequences between the STS segments for settling of an automatic gain control (AGC) value.

21. The responding device of claim 1, wherein the one or more processors are configured to:
switch transmit antennas during scrambled timestamp sequence (STS) gaps between STS segments, wherein each STS segment has an STS sensing part transmitted by an antenna of multiple transmit antennas; and
set an automatic gain control (AGC) value for each STS segment based at least in part on previous AGC values.

22. The responding device of claim 21, wherein the one or more processors are configured to negotiate an antenna sequence to be included in preambles of the STS segments.

23. The responding device of claim 1, wherein the one or more processors are configured to switch antennas between scrambled timestamp sequence (STS) packets.

24. A method of wireless communication performed by a responding device, comprising:
receiving a signal from an initiating device;
estimating, from the signal, a channel impulse response (CIR) that represents signal reflections from one or more objects as multiple taps;
selecting one or more taps, from the multiple taps, that are within a first time window that starts at a first offset from a reference point and that has a first specified time duration; and
transmitting, to the initiating device, a CIR report that indicates the one or more taps, wherein the CIR report includes the first specified time duration and the first offset.

25. The method of claim 24, wherein the first offset is based at least in part on a transmission time and a reference time associated with a sensing range of interest.

26. The method of claim 24, further comprising negotiating the reference point with one or more sensing devices.

27. The method of claim 24, wherein the reference point includes an earliest tap, a strongest tap, a packet detection time, or a center of mass for the multiple taps.

28. The method of claim 24, wherein selecting the one or more taps comprises selecting the one or more taps from within the first time window and a second time window having a second specified time duration and a second offset.

29. The method of claim 28, further comprising negotiating, with a sensing device, one or more of the first specified time duration, a starting point of the first time window, the second specified time duration, a starting point of the second time window, or a quantity of time windows.

30. The method of claim 28, further comprising receiving, from one or more sensing devices, one or more of a supported window time duration or a supported quantity of windows.

* * * * *